(12) United States Patent
Aoki

(10) Patent No.: US 11,088,646 B2
(45) Date of Patent: Aug. 10, 2021

(54) MOTOR DRIVING CONTROL DEVICE AND MOTOR DRIVING CONTROL METHOD

(71) Applicant: MINEBEA MITSUMI Inc., Nagano (JP)

(72) Inventor: Masato Aoki, Iwata (JP)

(73) Assignee: MINEBEA MITSUMI INC., Nagano (JP)

(*) Notice: Subject to any disclaimer, the term of this patent is extended or adjusted under 35 U.S.C. 154(b) by 37 days.

(21) Appl. No.: 16/781,120

(22) Filed: Feb. 4, 2020

(65) Prior Publication Data
US 2020/0259444 A1 Aug. 13, 2020

(30) Foreign Application Priority Data

Feb. 8, 2019 (JP) .............................. JP2019-021971

(51) Int. Cl.

| | |
|---|---|
| *B60L 50/00* | (2019.01) |
| *H02P 27/08* | (2006.01) |
| *G05B 11/28* | (2006.01) |
| *H02P 6/16* | (2016.01) |
| *H02P 5/00* | (2016.01) |
| *H02P 6/15* | (2016.01) |
| *H02P 23/14* | (2006.01) |

(52) U.S. Cl.
CPC .............. *H02P 27/08* (2013.01); *G05B 11/28* (2013.01); *H02P 5/00* (2013.01); *H02P 6/15* (2016.02); *H02P 6/16* (2013.01); *H02P 23/14* (2013.01)

(58) Field of Classification Search
CPC .. B60L 50/00; H02P 27/08; H02P 5/00; H02P 23/14; G05B 11/28
See application file for complete search history.

(56) References Cited

U.S. PATENT DOCUMENTS

2003/0111972 A1* 6/2003 Strothmann ............ B60L 50/00
318/268

FOREIGN PATENT DOCUMENTS

JP H09-331696 A 12/1997

* cited by examiner

*Primary Examiner* — Cortez M Cook
(74) *Attorney, Agent, or Firm* — Pearne & Gordon LLP

(57) ABSTRACT

A motor driving control device drives each of a first motor and a second motor based on a predetermined condition designation signal, and includes a control unit, a first motor driving unit and a second motor driving unit. The control unit outputs first and second PWM signals to control driving of the first and second motors, respectively. Each of the first and second motor driving units flow a current through the first and second motors based on the first and second PWM signals, respectively. The control unit includes a determination means configured to determine whether the condition designation signal meets a predetermined mode switching condition, and an adjustment means configured to perform overlapping-related adjustment of an on period of the first PWM signal and an on period of the second PWM signal, based on a determination result of the determination means.

12 Claims, 15 Drawing Sheets

MOTOR DRIVING CONTROL DEVICE AND MOTOR DRIVING CONTROL METHOD

CROSS REFERENCE TO RELATED APPLICATIONS

This application claims the benefit of Japanese Patent Application No. 2019-021971, filed Feb. 8, 2019, which is hereby incorporated by reference in its entirety.

BACKGROUND

Technical Field

The present disclosure relates to a motor driving control device and a motor driving control method, and in particular to a motor driving control device that drives a plurality of motors and a motor driving control method to drive a plurality of motors.

Background

Examples of a device using a motor includes a device having a plurality of motors as driving sources, for example. Some of motor driving control devices each driving such a device having a plurality of motors control the plurality of motors based on a single input signal. Examples of a device using such a motor driving control device include a counter-rotating blower that has a structure in which two axial flow fans different from each other in rotation direction of an impeller are stacked in a rotation axis direction.

Japanese Patent Application Laid-Open No. H09-331696 discloses a motor driving device that drives each of a plurality of motors and suppresses fluctuation of a power supply voltage by shifting phases of pulses of PWM signals to be supplied to respective motor driving units in order to downsize smoothing capacitors.

SUMMARY

In a device using a motor, there is a need to suppress the maximum value of the power supply current flowing through the whole of the device depending on a situation. To meet such a need, it is desirable to suppress the maximum value of the power supply current flowing through the plurality of motors under a specific situation. The configuration disclosed in Japanese Patent Application Laid-Open No. H09-331696 described above, however, cannot suppress the maximum value of the power supply current flowing through the plurality of motors in some cases.

The present disclosure is related to providing a motor driving control device and a motor driving control method capable of suppressing the maximum value of the power supply current flowing through the plurality of motors.

In accordance with one aspect of the present disclosure, a motor driving control device drives each of a first motor and a second motor based on a predetermined condition designation signal, and includes a control unit configured to output a first PWM (pulse width modulation) signal to control driving of the first motor and a second PWM signal to control driving of the second motor, a first motor driving unit configured to flow a current through the first motor based on the first PWM signal, and a second motor driving unit configured to flow a current through the second motor based on the second PWM signal. The control unit includes a determination means configured to determine whether the condition designation signal meets a predetermined mode switching condition, and an adjustment means configured to perform overlapping-related adjustment of an on period of the first PWM signal and an on period of the second PWM signal, based on a determination result of the determination means.

Preferably, the control unit operates in a first control mode in a case where the determination means does not determine that the condition designation signal meets the mode switching condition, and operates in a second control mode in a case where the determination means determines that the condition designation signal meets the mode switching condition. In the second control mode the adjustment means performs the overlapping-related adjustment so that an overlapping amount of the on period of the first PWM signal and the on period of the second PWM signal is smaller than an overlapping amount in a case where the operation is performed in the first control mode.

Preferably, the control unit further includes an upper limit setting means configured to set an upper limit value of a sum of the current flowing through the first motor and the current flowing through the second motor, and the upper limit setting means sets the upper limit value in the case where the operation is performed in the second control mode to a value lower than the upper limit value in the case where the operation is performed in the first control mode.

Preferably, when the operation is performed in the second control mode, the adjustment means performs the overlapping-related adjustment so that the sum of the current flowing through the first motor and the current flowing through the second motor is lower than the upper limit value set by the upper limit setting means.

Preferably, when the control mode is switched from the first control mode to the second control mode, the control unit reduces a duty ratio of the first PWM signal and a duty ratio of the second PWM signal to predetermined values, and then increases the duty ratio of the first PWM signal and the duty ratio of the second PWM signal to perform the overlapping-related adjustment.

Preferably, the motor driving control device further includes a speed detection means configured to detect a rotational speed of the first motor and a rotational speed of the second motor, respectively. When control operation is performed in the first control mode, the control unit performs feedback control of the rotational speed of the first motor and the rotational speed of the second motor based on a detection result of the speed detection means. When the control operation is performed in the second control mode, the control unit does not perform the feedback control.

Preferably, the adjustment means performs the overlapping-related adjustment by adjusting rising timing and a duty ratio of each of the first PWM signal and the second PWM signal.

Preferably, the adjustment means performs the overlapping-related adjustment by synchronizing one of the first PWM signal and the second PWM signal with the other signal.

Preferably, the mode switching condition is a prescribed level of the condition designation signal.

Preferably, the condition designation signal is a pulse signal, and the adjustment means performs the overlapping-related adjustment by synchronizing the first PWM signal and the second PWM signal with the condition designation signal.

Preferably, the adjustment means adjusts rising timing of each of the first PWM signal and the second PWM signal based on a period of the condition designation signal and a predetermined delay time to a pulse of the condition designation signal.

Preferably, the mode switching condition is a condition relating to at least one of a period and a duty ratio of the condition designation signal.

Preferably, the condition designation signal is a speed command signal that indicates a target rotational speed of the first motor and a target rotational speed of the second motor.

In accordance with another aspect of the present disclosure, a motor driving control method is provided to drive each of a first motor and a second motor based on a predetermined condition designation signal with use of a first motor driving unit configured to flow a current through the first motor based on a first PWM signal to control driving of the first motor, and a second motor driving unit configured to flow a current through the second motor based on a second PWM signal to control driving of the second motor, and the motor driving control method includes determining whether the condition designation signal meets a predetermined mode switching condition, and performing overlapping-related adjustment of an on period of the first PWM signal and an on period of the second PWM signal, based on a determination result of the determining step.

According to these aspects of the present disclosure, it is possible to provide a motor driving control device and a motor driving control method capable of suppressing the maximum value of the power supply current flowing through the plurality of motors.

DETAILED DESCRIPTION

Hereinafter, a blowing device using a motor driving control device according to an embodiment of the present disclosure will be described.

Embodiment

Figure 1:
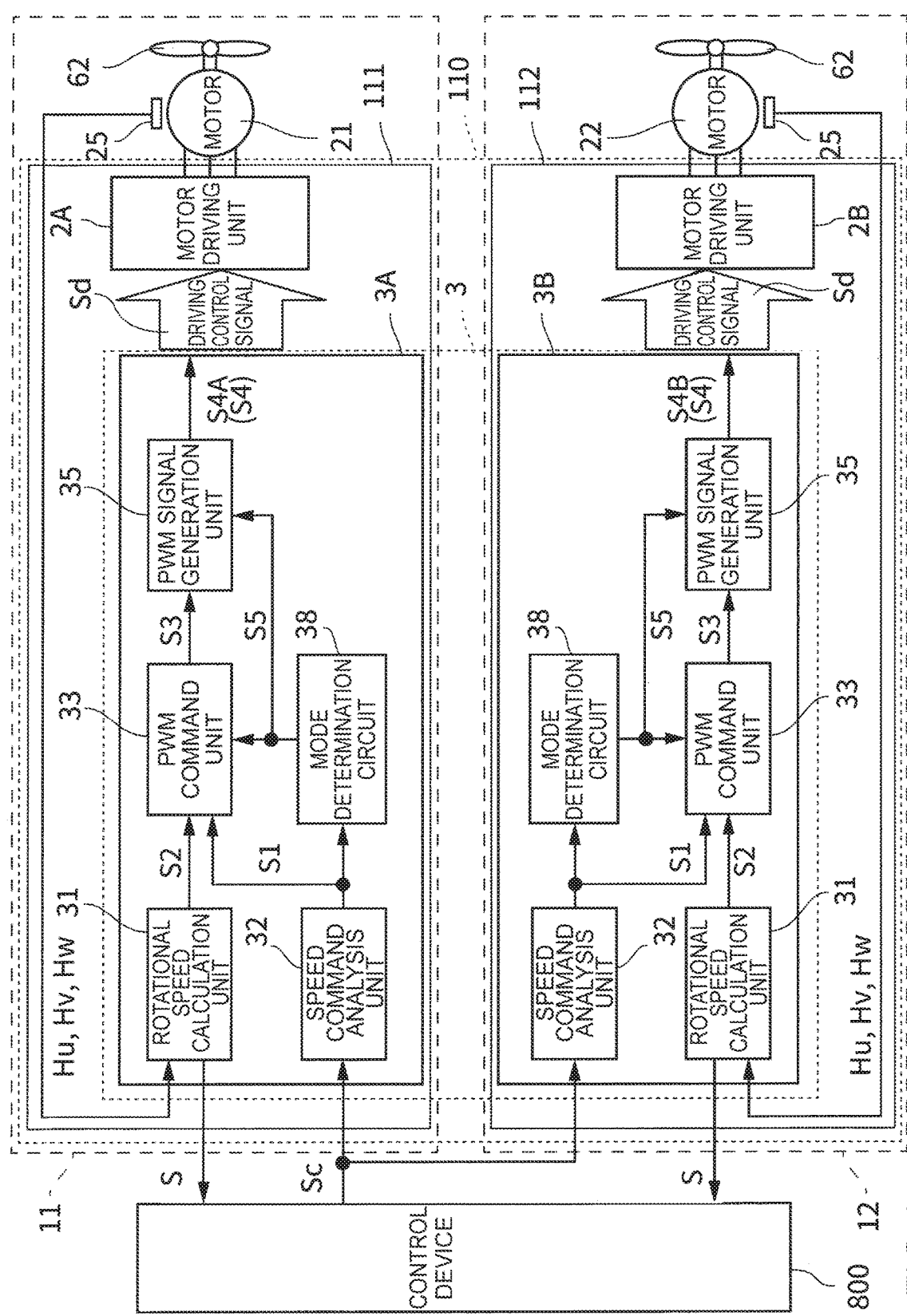
FIG. 1 is a block diagram illustrating a configuration of a fan according to an embodiment of the present disclosure.

FIG. 1 is a block diagram illustrating a configuration of a fan 1 according to an embodiment of the present disclosure.

As illustrated in FIG. 1, the fan 1 is a blowing device that includes two blowers 11 and 12 (first blower 11 and second blower 12) each including an impeller 62. The fan 1 is, for example, a counter-rotating blower including a structure in which the two axial flow blowers 11 and 12 different in rotation direction of the impellers 62 are stacked in a rotation axis direction. However, the fan 1 is not limited to the counter-rotating blower. In the present embodiment, the integral fan 1 is configured in such a manner that the two blowers 11 and 12 on an inlet side (intake side) and an outlet side (exhaust side) are integrally attached to a frame (not illustrated). The fan 1 is, for example, a fan motor that exhausts heat generated inside an electronic device such as an electronic computer and an OA device, to the outside by wind force, thereby cooling the inside of the electronic device.

More specifically, the fan 1 includes a first motor 21 provided in the first blower 11, a second motor 22 provided in the second blower 12, and a motor driving control device 110 that drives each of the first motor 21 and the second motor 22 based on a speed command signal (example of predetermined condition designation signal) Sc.

The first motor 21 rotates the impeller 62 of the first blower 11. The impeller 62 is attached to a rotary shaft of a rotor of the first motor 21. Further, the second motor 22 rotates the impeller 62 of the second blower 12. The impeller 62 is attached to a rotary shaft of a rotor of the second motor 22.

The motor driving control device 110 includes a first motor driving control unit 111 that drives the first motor 21 and a second motor driving control unit 112 that drives the second motor 22.

In other words, the first blower 11 includes the first motor 21 and the first motor driving control unit 111, and the second blower 12 includes the second motor 22 and the second motor driving control unit 112.

Hereinafter, the first motor 21 and the second motor 22 are not distinguished and are denoted by the motors 21 and 22 in some cases. Further, the first motor driving control unit 111 and the second motor driving control unit 112 are not distinguished and are denoted by the motor driving control units 111 and 112 in some cases.

The motor driving control units 111 and 112 respectively drive the motors 21 and 22. In the present embodiment, each of the motors 21 and 22 is, for example, a three-phase brushless motor. The motor driving control units 111 and 112 periodically flow driving currents through coils of the motors 21 and 22 to rotate the motors 21 and 22, respectively.

The fan 1 is connected to a control device 800 that is an external device. In the present embodiment, the control device 800 outputs the speed command signal Sc corresponding to a rotational speed (rotational frequency) of each of the motors 21 and 22, to each of the blowers 11 and 12. The speed command signal Sc is input to each of the motor driving control units 111 and 112. The motor driving control units 111 and 112 can respectively drive the motors 21 and 22 at the rotational speed corresponding to the speed command signal Sc. Note that the motor driving control units 111 and 112 output rotational speed signals S (for example, FG signals) corresponding to the respective motors 21 and 22. The control device 800 can detect driving states of the blowers 11 and 12 based on the rotational speed signals S, and can control the speed command signal Sc to be output based on the driving states. Note that the rotational speed signals S may not be output to the outside of the fan 1.

In the present embodiment, the first motor driving control unit 111 and the second motor driving control unit 112 perform substantially the same operation except for specific operation in a specific control mode described below, and the like.

As described below, the motor driving control device 110 includes a control unit (example of adjustment means, and example of upper limit setting means) 3, a first motor driving unit 2A, and a second motor driving unit 2B. The control unit 3 outputs a first PWM (pulse width modulation) signal S4A to control driving of the first motor 21 and a second PWM signal S4B to control driving of the second motor 22. The first motor driving unit 2A flows a current through the first motor 21 based on the first PWM signal S4A. The second motor driving unit 2B flows a current through the second motor 22 based on the second PWM signal S4B. Note that FIG. 1 illustrates a part of components of the motor driving control device 110, and the motor driving control device 110 may include other components in addition to the components illustrated in FIG. 1. Hereinafter, in a case where it is unnecessary to distinguish the first PWM signal S4A and the second PWM signal S4B, operation is described while the signals are collectively referred to as PWM signals S4.

The control unit 3 includes a first control unit 3A and a second control unit 3B. The first control unit 3A controls driving of the first motor 21 by outputting the first PWM signal S4A. The second control unit 3B controls driving of the second motor 22 by outputting the second PWM signal S4B. The control unit 3 generates the first PWM signal S4A and outputs the first PWM signal S4A as a driving control signal Sd to the first motor driving unit 2A. In addition, the control unit 3 generates the second PWM signal S4B and outputs the second PWM signal S4B as the driving control signal Sd to the second motor driving unit 2B.

In the present embodiment, the first motor driving control unit 111 and the second motor driving control unit 112 include the same hardware configuration. The first motor driving control unit 111 includes the first motor driving unit 2A and the first control unit 3A. The second motor driving control unit 112 includes the second motor driving unit 2B and the second control unit 3B. In the following description, components common to the first motor driving control unit 111 and the second motor driving control unit 112 are denoted by the same reference numerals, and description of the components is common to the first motor driving control unit 111 and the second motor driving control unit 112 unless otherwise noted. Further, the components and the operation are described while the first control unit 3A and the second control unit 3B are collectively referred to as the control unit 3 when it is unnecessary to distinguish the first control unit 3A and the second control unit 3B, and while the first motor driving unit 2A and the second motor driving unit 2B are collectively referred to as the motor driving units 2 when it is unnecessary to distinguish the first motor driving unit 2A and the second motor driving unit 2B.

In the present embodiment, each of the motor driving control units 111 and 112 is an integrated circuit (IC) device that is partially packaged (for example, control unit 3 and motor driving unit 2). Note that all of the motor driving control units 111 and 112 may be packaged as one integrated circuit device, or a part or all of the motor driving control units 111 and 112 is packaged together with other devices to configure one integrated circuit device.

Each motor driving unit 2 includes an inverter circuit and a pre-drive circuit. The motor driving units 2 output driving signals to the motors 21 and 22 based on the driving control signals Sd output from the control unit 3, thereby driving the motors 21 and 22. In other words, the motor driving units 2 flow currents through the motors 21 and 22 to drive the motors 21 and 22 based on the driving control signals Sd output from the control unit 3.

The pre-drive circuits generate output signals to drive the respective inverter circuits under the control of the control unit 3, and output the output signals to the respective inverter circuits. The inverter circuits output driving signals to the respective motors 21 and 22 based on the output signals output from the pre-drive circuits, thus energizing the coils included in the motors 21 and 22.

The speed command signal Sc output from the control device 800 is input to the control unit 3. Further, the control unit 3 outputs rotational speed signals S to the control device 800.

The speed command signal Sc indicates a target rotational speed of the first motor 21 and a target rotational speed of the second motor 22. For example, the speed command signal Sc is a PWM (pulse width modulation) signal (example of pulse signal) having a duty ratio (on-duty) corresponding to the target rotational speeds of the motors 21 and 22. In other words, the speed command signal Sc is speed command information corresponding to target values of the rotational speeds of the motors 21 and 22. Note that any pulse signals may be used as the speed command signal Sc and the speed command signal Sc may be, for example, a clock signal having a frequency corresponding to the target rotational speeds.

Further, in the present embodiment, three Hall signals (position detection signals) Hu, Hv and Hw are input to the control unit 3 from each of the motors 21 and 22. For example, the Hall signals Hu, Hv and Hw are output signals of three Hall elements 25u, 25v and 25w disposed in each of the motors 21 and 22. The Hall signals Hu, Hv and Hw are signals corresponding to rotation of the rotor of each of the motors 21 and 22. The control unit 3 detects a rotation state of each of the motors 21 and 22 with use of the Hall signals Hu, Hv and Hw, and controls driving of the motors 21 and 22. In other words, the control unit 3 detects the rotational position of the rotor of each of the motors 21 and 22 with use of the Hall signals Hu, Hv and Hw, thereby controlling driving of the motors 21 and 22. Further, the control unit 3 can acquire actual rotational speed information regarding actual rotational speed of the rotor of each of the motors 21 and 22 with use of the Hall signals Hu, Hv and Hw, thereby controlling driving of the motors 21 and 22.

For example, the three Hall elements 25 (one Hall element 25 of each of motors 21 and 22 is illustrated for simplification in FIG. 1) outputting the respective Hall signals Hu, Hv and Hw are disposed around the rotor of each of the motors 21 and 22 at substantially equal intervals. The three Hall elements 25 detect magnetic poles of the rotor of the corresponding motor 21 or 22 and output the Hall signals Hu, Hv and Hw.

Note that, additionally or alternatively to such Hall signals Hu, Hv and Hw, other information regarding the rotation states of the motors 21 and 22 may be input to the control unit 3. For example, as the FG signal corresponding to rotation of the rotor of each of the motors 21 and 22, a signal (pattern FG) generated using a coil pattern provided on a substrate on the rotor side may be input to the control unit 3. Further, the rotation states of the motors 21 and 22 may be detected based on detection results of rotational position detection circuits that detect a back electromotive voltage induced in each of phases (U phase, V phase and W phase) of the motors 21 and 22. An encoder, a resolver, or the like may be provided to detect information on the rotational speeds of the motors 21 and 22.

The control unit 3 is configured by, for example, a microcomputer or a digital circuit. The control unit 3 outputs the driving control signals Sd to drive the motors 21 and 22 based on the input signals. More specifically, the control unit 3 outputs the driving controls signals Sd to the motor driving units 2 based on the Hall signals Hu, Hv and Hw.

The control unit 3 outputs, to the motor driving units 2, the driving control signals Sd to drive the motors 21 and 22, thereby controlling rotation of the motors 21 and 22. The motor driving units 2 output driving signals to the motors 21 and 22 to drive the motors 21 and 22, based on the driving control signals Sd.

Each of the first control unit 3A and the second control unit 3B includes a rotational speed calculation unit (example of speed detection means) 31 that detects rotational speed of the corresponding motor 21 or 22, a speed command analysis unit 32, a PWM command unit 33, a PWM signal generation unit 35, and a mode determination circuit (example of determination means) 38.

The Hall signals Hu, Hv and Hw output from the corresponding three Hall elements 25 are input to each of the rotational speed calculation units 31. Each of the rotational speed calculation units 31 outputs positional signals indicating positional relationship between the phases and the rotor of the corresponding motor 21 or 22, based on the input Hall signals Hu, Hv and Hw. Further, the rotational speed calculation units 31 generate the actual rotational speed information corresponding to periods of the positional signals based on the Hall signals Hu, Hv and Hw, and output the actual rotational speed information. In other words, each of the rotational speed calculation units 31 outputs the actual rotational speed information regarding actual rotational speed of the rotor of the corresponding motor 21 or 22. In the figure, actual rotational frequency signals S2, each including the positional signal and the actual rotational speed information, are illustrated. The actual rotational frequency signals S2 are output to the respective PWM command units 33.

The speed command signal Sc is input to the speed command analysis units 32. Each of the speed command analysis units 32 outputs a target rotational speed signal S1 indicating the target rotational speed of the corresponding motor 21 or 22. The target rotational speed signals S1 are PWM signals each indicating the duty ratio which is identical to the duty ratio of the speed command signal Sc. Each of the target rotational speed signals S1 is output to the corresponding PWM command unit 33 and the corresponding mode determination circuit 38.

The actual rotational frequency signals S2 output from the rotational speed calculation units 31 and the target rotational speed signals S1 output from the speed command analysis units 32 are input to the PWM command units 33. Further, mode setting signals S5 output from the mode determination circuits 38 described below are input to the PWM command units 33. The PWM command units 33 generate PWM setting instruction signals S3 indicating duty ratios for output of the driving control signals Sd based on the input signals, and outputs the PWM setting instruction signals S3. The PWM setting instruction signals S3 are output to the respective PWM signal generation units 35.

The PWM setting instruction signals S3 are input to the respective PWM signal generation units 35. Further, mode setting signals S5 output from the mode determination circuits 38 described below are input to the respective PWM signal generation units 35. The PWM signal generation units 35 generate respective PWM signals S4 (first PWM signal S4A and second PWM signal S4B) to drive the motor driving units 2 based on the PWM setting instruction signals S3. The PWM signals S4 have a duty ratio identical to the duty ratio of the PWM setting instruction signals S3. In other words, the PWM signals S4 have a duty ratio corresponding to the PWM setting instruction signals S3.

The PWM signals S4 output from the respective PWM signal generation units 35 are output as the driving control signals Sd from the control unit 3 to the motor driving units 2. As a result, the driving signals are output from the motor driving units 2 to the motors 21 and 22 so that the motors 21 and 22 are driven.

The mode determination circuits 38 set the control modes of the respective control units 3A and 3B. The target rotational speed signals S1 are input to the mode determination circuits 38, and the mode determination circuits 38 output the mode setting signals S5 corresponding to the set control modes, based on the input signals. For example, the mode setting signals S5 each indicate one of the control modes and the other control mode by the high and the low of the voltage (on potential or off potential). However, the mode setting signals S5 are not limited to such signals. Each of the mode setting signals S5 is input to the corresponding PWM command unit 33 and the corresponding PWM signal generation unit 35.

The mode determination circuits 38 each determine whether a condition designation signal meets a predetermined mode switching condition, and output the corresponding mode setting signal S5 based on the determination result. The mode switching condition is a condition relating to the duty ratio of the speed command signal Sc. More specifically, the mode switching condition indicates that the duty ratio of the speed command signal Sc is a value within a predetermined range. Note that the mode switching condition is not limited to the above-described condition, and may be a condition relating to at least one of a period and the duty ratio of the speed command signal Sc.

In this case, it can be said that the control unit 3 includes a determination means determining whether the speed command signal Sc meets the predetermined mode switching condition, and an adjustment means performing overlapping-related adjustment of an on period of the first PWM signal S4A and an on period of the second PWM signal S4B based on a determination result of the determination means. In other words, the motors 21 and 22 are driven by a method for controlling driving of a motor, and the method includes determining whether the speed command signal Sc meets the predetermined mode switching condition, and performing overlapping-related adjustment of the on period of the first PWM signal S4A and the on period of the second PWM signal S4B based on the determination result of the determining step.

The control unit 3 includes, as the control modes for controlling the motors 21 and 22, a first control mode and a second control mode.

The first control mode is a normal driving mode in which the motors 21 and 22 are driven at the rotational speeds corresponding to the speed command signal Sc. In other words, in the first control mode, speed feedback control of the rotational speed of the first motor 21 and the rotational speed of the second motor 22 is performed based on the actual rotational speeds of the respective motors 21 and 22, namely, the detection results of the respective rotational speed calculation units 31, and the speed command signal Sc.

The second control mode is, as will be described later, a control mode in which peak current suppression control to suppress a peak current value of a sum of the power supply currents of the motors 21 and 22 relative to the peak current value in the first control mode is performed. In the second control mode a method for outputting the first PWM signal S4A and the second PWM signal S4B is adjusted to suppress the sum of the power supply currents of the motors 21 and 22 to a predetermined current threshold or less. In other words, when the control operation is performed in the second control mode, the control unit 3 does not perform the above-described speed feedback control. In the present embodiment, the second control mode can be also referred to as a PWM overlapping control mode because overlapping of the on period of the first PWM signal S4A and the on period of the second PWM signal S4B is adjusted in the second control mode. In the second control mode the control unit 3 as the adjustment means performs overlapping-related adjustment so that an overlapping amount of the on period of the first PWM signal S4A and the on period of the second PWM signal S4B is reduced as compared with the case where operation is performed in the first control mode.

In a case where it is not determined that the speed command signal Sc meets the mode switching condition, the control unit 3 operates in the first control mode. In a case where it is determined that the speed command signal Sc meets the mode switching condition, the control unit 3 operates in the second control mode. In other words, in the case where it is determined that the speed command signal Sc meets the mode switching condition, the adjustment is performed such that the overlapping amount of the on period of the first PWM signal S4A and the on period of the second PWM signal S4B becomes smaller than the overlapping amount in the case where it is not determined that the speed command signal Sc meets the mode switching condition. As a result, the peak current value of the sum of the power supply currents of the motors 21 and 22 is suppressed as compared with the peak current value in the first control mode.

Further, the control unit 3 sets, as the upper limit setting means, an upper limit value (current limit value) of the sum of the current flowing through the first motor 21 and the current flowing through the second motor 22. The upper limit value in the case where the operation is performed in the second control mode, is set lower than the upper limit value in the case where the operation is performed in the first control mode. Further, when the operation is performed in the second control mode, the adjustment means performs the overlapping-related adjustment so that the sum of the current flowing through the first motor 21 and the current flowing through the second motor 22 is lower than the upper limit value set by the upper limit setting means.

In the present embodiment, the operation when such overlapping-related adjustment (hereinafter, referred to as overlapping adjustment) of the on period of the first PWM signal S4A and the on period of the second PWM signal S4B is performed, is specifically performed, for example, by the PWM command units 33 and the PWM signal generation units 35, as the adjustment means. Further, the operation is performed by, for example, the mode determination circuits 38 as the determination means.

More specifically, each of the mode determination circuits 38 determines whether the speed command signal Sc meets the predetermined mode switching condition. In the present embodiment, for example, the fact that the duty ratio of the speed command signal Sc is 5% is defined as the predetermined mode switching condition. When each of the mode determination circuits 38 determines that the duty ratio of the speed command signal Sc is 5% based on the corresponding target rotational speed signal S1, each of the mode determination circuits 38 outputs the mode setting signal S5 corresponding to the second control mode. In contrast, when each of the mode determination circuits 38 determines that the duty ratio of the speed command signal Sc is not 5% based on the corresponding target rotational speed signal S1 (in a case where it is not determined that the duty ratio of the speed command signal Sc is 5%), each of the mode determination circuits 38 outputs the mode setting signal S5 corresponding to the first control mode.

Note that it is preferable that the mode switching condition be set to a condition including a predetermined range. More specifically, for example, it is preferable that the condition be set such that the speed command signal Sc is determined to meet the predetermined mode switching condition when the duty ratio of the speed command signal Sc is within a range of 5%±1%.

The PWM command units 33 and the PWM signal generation units 35 are operated in any of the first control mode and the second control mode indicated by the mode setting signals S5, based on the mode setting signals S5.

More specifically, in the first control mode, the PWM command units 33 and the PWM signal generation units 35 perform the speed feedback control of the motors 21 and 22 based on the actual rotational frequency signals S2 and the target rotational speed signals S1 as described above. At this time, the first control unit 3A and the second control unit 3B perform speed feedback control without synchronizing the first PWM signal S4A with the second PWM signal S4B.

In contrast, in the second control mode, the PWM command units 33 and the PWM signal generation units 35 perform the overlapping control and output the first PWM signal S4A and the second PWM signal S4B. At this time, the PWM command unit 33 and the PWM signal generation unit 35 of the first control unit 3A perform the overlapping adjustment by synchronizing the first PWM signal S4A with the speed command signal Sc. Further, the PWM command unit 33 and the PWM signal generation unit 35 of the second control unit 3B perform the overlapping adjustment by synchronizing the second PWM signal S4B with the speed command signal Sc. In other words, the control unit 3 performs the overlapping adjustment by synchronizing the first PWM signal S4A and the second PWM signal S4B with the speed command signal Sc.

Further, in the second control mode, the PWM command units 33 and the PWM signal generation units 35 perform the overlapping adjustment by adjusting rising timing (on timing) and the duty ratio of each of the first PWM signal S4A and the second PWM signal S4B. Such overlapping adjustment is performed based on the period of the speed command signal Sc and a predetermined delay time with respect to a pulse of the speed command signal Sc as described below.

Figure 2:
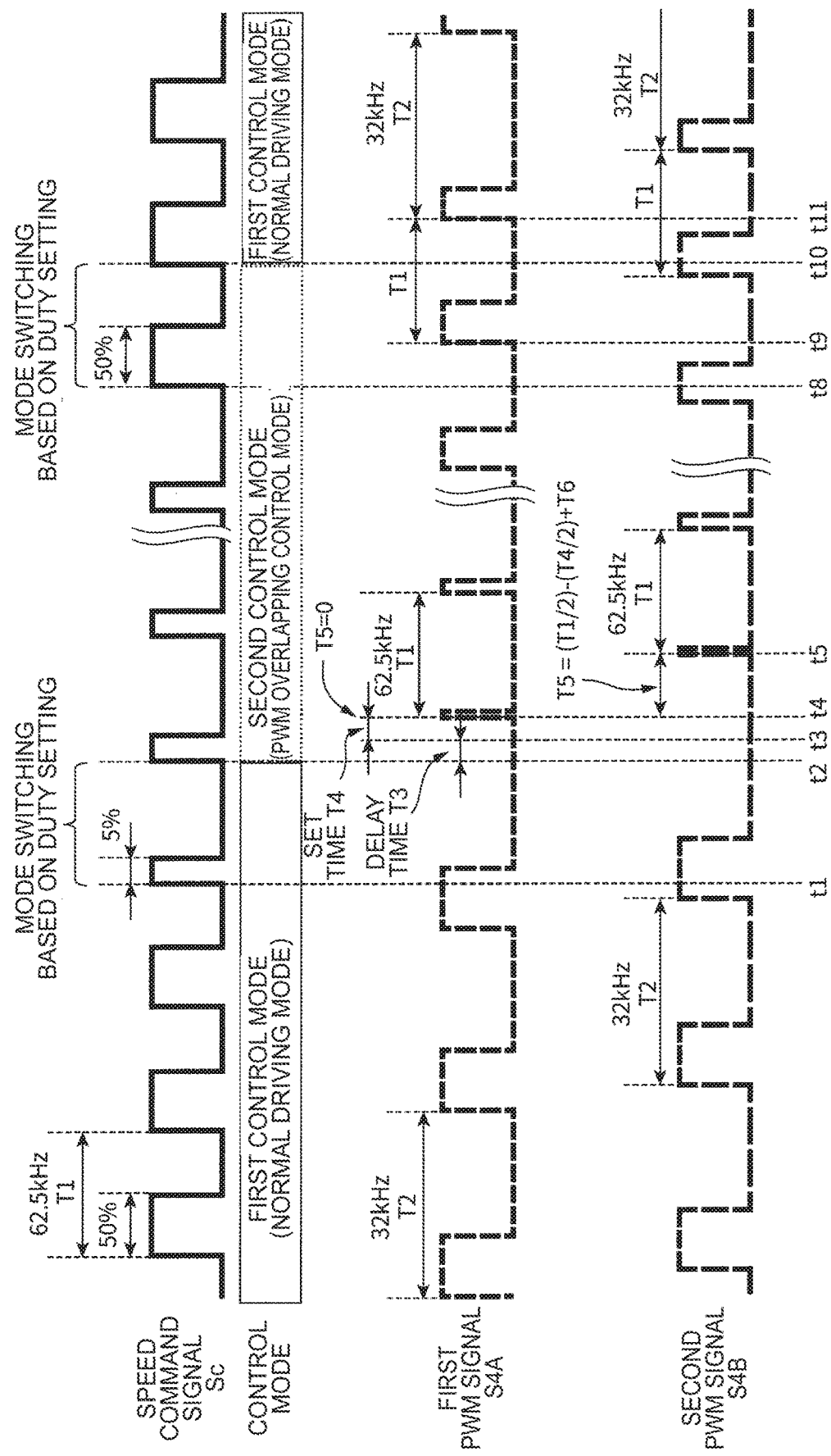
FIG. 2 is a timing chart to explain an operation example of a control unit according to the present embodiment.

FIG. 2 is a timing chart to explain an operation example of the control unit 3 according to the present embodiment.

In FIG. 2 a waveform of the speed command signal Sc, the control mode of the control unit 3, a waveform of the first PWM signal S4A, and a waveform of the second PWM signal S4B are schematically illustrated in order from an upper side.

As illustrated in FIG. 2, a period T1 of the speed command signal Sc is, for example, 62.5 kHz. For example, when the duty ratio of the speed command signal Sc is about 50% as with the duty ratio before time t1, the speed command signal Sc does not meet the predetermined mode switching condition, and the control unit 3 is operated in the first control mode.

In the first control mode, the first control unit 3A and the second control unit 3B each output the corresponding PWM signal S4, a period T2 of which is 32 kHz, based on the duty ratio of the speed command signal Sc. At this time, the first PWM signal S4A and the second PWM signal S4B are not synchronized with each other. However, this is not limitative. Note that the duty ratio of the first PWM signal S4A and the duty ratio of the second PWM signal S4B output corresponding to the same speed command signal Sc may be equal to or different from each other.

At time t1, the duty ratio of the speed command signal Sc is set to 5%. As a result, it is determined by the mode determination circuits 38 that the speed command signal Sc meets the predetermined mode switching condition, and the control unit 3 is operated in the second control mode. Note that the switching from the first control mode to the second control mode and the switching from the second control mode to the first control mode may be immediately performed or may be performed after a predetermined time has elapsed (for example, at a time after time corresponding to one period of speed command signal Sc has elapsed).

In the second control mode, the first control unit 3A and the second control unit 3B respectively output the first PWM signal S4A and the second PWM signal S4B, with the rising timing of the speed command signal Sc as a reference. The first control unit 3A and the second control unit 3B respectively set the period of the first PWM signal S4A and the period of the second PWM signal S4B to the period T1 of the speed command signal Sc. In other words, in the second control mode, the first PWM signal S4A and the second PWM signal S4B are output in synchronization with the speed command signal Sc.

At this time, the PWM command units 33 determine the duty ratios of the respective PWM signals S4 to predetermined values, irrespective of the duty ratio of the speed command signal Sc. Further, the PWM signal generation units 35 adjusts the rising timing of the first PWM signal S4A and the rising timing of the second PWM signal S4B and output the first PWM signal S4A and the second PWM signal S4B, based on the period of the speed command signal Sc and a predetermined delay time T4 with respect to the pulse of the speed command signal Sc. Further, the PWM signal generation unit 35 of the second control unit 3B adjusts the rising timing of the second PWM signal S4B in consideration of a predetermined adjustment time T6.

For example, a case where time t2 when the control mode is switched to the second control mode corresponds to the rising timing of the speed command signal Sc is assumed.

Further, it is assumed that it takes a delay time T3 from the rising timing of the speed command signal Sc until the PWM signals S4 are able to be output, and the predetermined delay time T4 and the predetermined adjustment time T6 are set.

At this time, the PWM signal generation unit 35 of the first control unit 3A performs adjustment with reference to time t3 after the delay time T3 has elapsed from time t2 such that the rising timing of the first PWM signal S4A comes at time t4 after the predetermined delay time T4 has elapsed from time t3. In other words, a period T5 from time t4 to the rising timing of the first PWM signal S4A is zero.

On the other hand, the PWM signal generation unit 35 of the second control unit 3B performs adjustment such that the rising timing of the second PWM signal S4B comes at time t5 delayed from time t4 by the period T5 calculated from a predetermined calculation expression. In other words, the period T5 from time t4 to the rising timing of the second PWM signal S4B is not zero, and the rising timing of the second PWM signal S4B is shifted by the period T5 with respect to the rising timing of the first PWM signal S4A.

The period T5 from time t4 to the rising timing of the second PWM signal S4B is determined by the following calculation expression. In other words, the period T5 is calculated from the calculation expression that includes the period T1 of the speed command signal Sc, the predetermined delay time T4, and the predetermined adjustment time T6 as parameters. Note that the period T5 may be previously calculated and stored in the control unit 3, or the control unit 3 may calculate the period T5 as needed. The predetermined adjustment time T6 is a value for timing adjustment, and can be appropriately set based on a use application of the individual fan 1, various kinds of use conditions, and the like. In a case where a load and operation characteristics of each of the used motors 21 and 22 are changed depending on environmental temperature and the like, these parameters may be varied based on, for example, temperature detected by a built-in sensor (not illustrated) or temperature information transmitted from the control device.

$$T5=(T1/2)-(T4/2)+T6$$

In the present embodiment, in the second control mode, the duty ratio of each of the first PWM signal S4A and the second PWM signal S4B, the predetermined delay time T4, and the predetermined adjustment time T6 are set such that the on period of the first PWM signal S4A and the on period of the second PWM signal S4B do not overlap with each other. Note that, in the second control mode, the on period of the first PWM signal S4A and the on period of the second PWM signal S4B may partially overlap with each other. In the second control mode, it is sufficient to perform adjustment such that the overlapping amount of the on period of the first PWM signal S4A and the on period of the second PWM signal S4B becomes smaller than the overlapping amount in the case where operation is performed in the first control mode.

As described above, after the control mode is switched to the second control mode, the overlapping adjustment is performed such that the first PWM signal S4A and the second PWM signal S4B are synchronized with each other with the period identical to the period T1 of the speed command signal Sc, and the on period of the first PWM signal S4A and the on period of the second PWM signal S4B do not overlap with each other.

At this time, the PWM command units 33 reduce both of the duty ratio of the first PWM signal S4A and the duty ratio of the second PWM signal S4B to predetermined values when the control mode is switched from the first control mode to the second control mode. Thereafter, the PWM command units 33 increase both of the duty ratio of the first PWM signal S4A and the duty ratio of the second PWM signal S4B and the overlapping adjustment is performed in that state. At this time, for example, the duty ratio of each of the PWM signals S4 may be reduced once to zero and then gradually increased, or may be reduced once to a predetermined value close to zero and then reset to a predetermined value higher than the predetermined value. Performing such control makes it possible to surely reduce the power supply current flowing through the fan 1 in the second control mode.

A case where the duty ratio of the speed command signal Sc is changed to, for example, 50% at time t8 while the operation in the second control mode is performed as described above, is assumed. In this case, at time t10 when the current period of the speed command signal Sc ends, each of the mode determination circuits 38 determines that the speed command signal Sc does not meet the predetermined mode switching condition, and the control unit 3 is operated in the first control mode.

When the control mode is returned to the first control mode, the first control unit 3A and the second control unit 3B each output the corresponding PWM signal S4, the period T2 of which is 32 kHz, based on the duty ratio of the speed command signal Sc. In other words, for example, when the rising timing of the first PWM signal S4A comes at time t9 after time t8 and before time t10, the next rising timing comes at time t11 after the period T1 from time t9 because the control mode at time t9 is the second control mode. Time t11 is after time t10, and the rising timing comes every period T2 thereafter. Further, also in the case of the second PWM signal S4B, when the rising timing comes after time t10, the rising timing comes every period T2. Note that the timing when the rising timing of each of the PWM signals S4 is adjusted to the timing in the first control mode is not limited to the above-described timing, and, for example, the timing may be a time after a predetermined period has elapsed from a time when it is determined that the speed command signal Sc does not meet the predetermined mode switching condition.

Note that the control unit 3 sets the upper limit value of the sum of the power supply currents flowing through the first motor 21 and the second motor 22. When the sum of the power supply currents exceeds the upper limit value due to load increase or the like, the control unit 3 stops output of the driving signals to the first motor 21 and the second motor 22. In the present embodiment, the upper limit value of the power supply currents in the first control mode is set to, for example, 4 A [Ampere] in order to protect the circuit of the first motor 21, the second motor 22, and the motor driving control device 110.

In contrast, the upper limit value in the case where the operation is performed in the second control mode is set to a value smaller than the upper limit value in the case where the operation is performed in the first control mode. More specifically, the upper limit value is set to, for example, 0.5 A. When the operation is performed in the second control mode, the PWM command units 33 and the PWM signal generation units 35 perform the overlapping adjustment such that the sum of the currents flowing through the first motor 21 and the second motor 22 becomes lower than 0.5 A as the upper limit value. In other words, the duty ratio of each of the PWM signals S4, the predetermined delay time T4, and the predetermined adjustment time T6 in the second control mode are set such that the sum of the currents flowing through the first motor 21 and the second motor 22 becomes lower than 0.5 A as the upper limit value.

Figure 3:
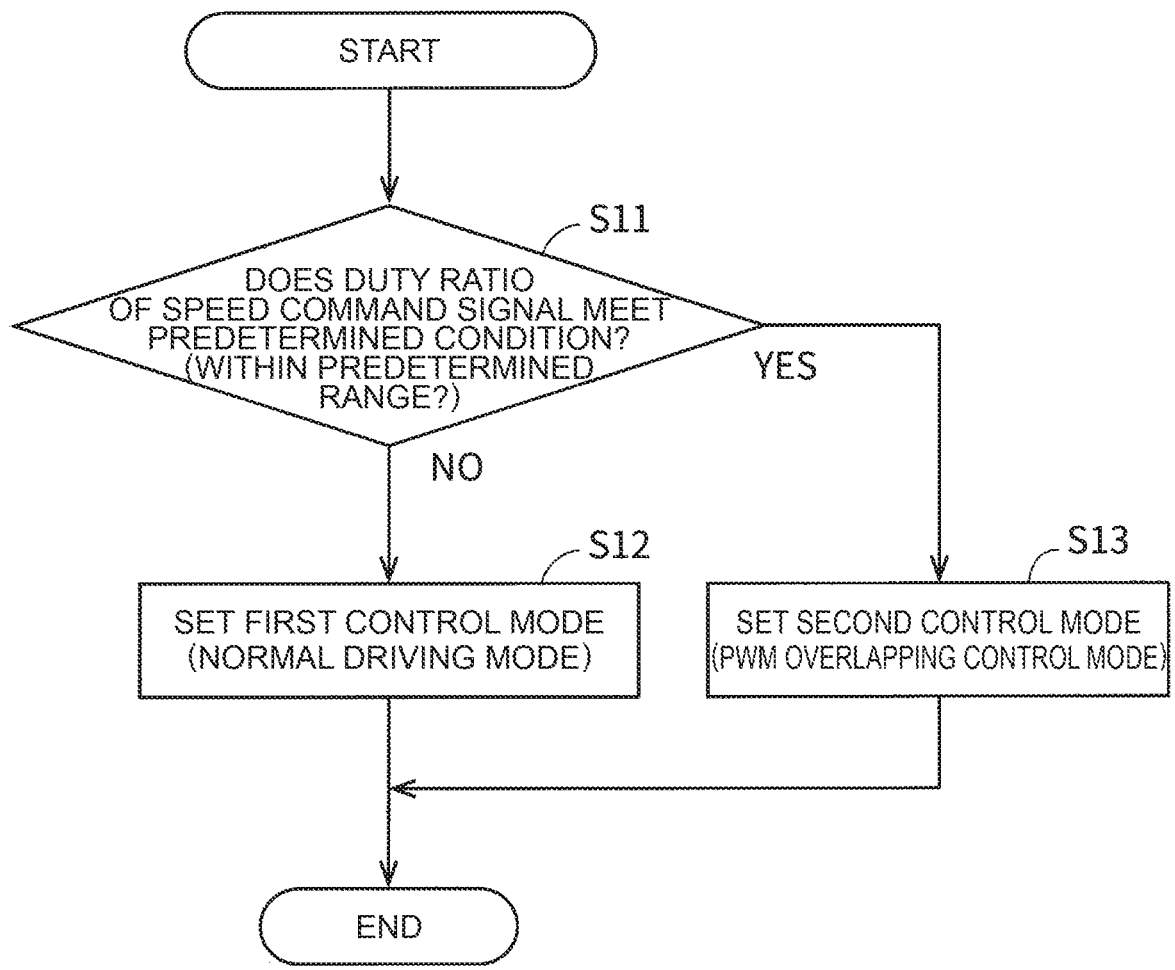
FIG. 3 is a first flowchart illustrating an example of a process performed by a control unit of a motor driving control device.

FIG. 3 is a first flowchart illustrating an example of a process performed by the control unit 3 of the motor driving control device 110.

In FIG. 3, a flow of the process relating to the setting of the control mode is illustrated. The process illustrated in FIG. 3 is periodically and repeatedly performed.

In step S11, each of the mode determination circuits 38 determines whether the duty ratio of the speed command signal Sc meets the predetermined mode switching condition. In other words, each of the mode determination circuits 38 determines whether the duty ratio of the speed command signal Sc is within a predetermined range (for example, within range of 5%±1%). When the duty ratio of the speed command signal Sc is within the predetermined range (YES), the process proceeds to step S13. Otherwise (NO), the process proceeds to step S12.

In step S12, the control unit 3 sets the control mode to the first control mode. The PWM command units 33 and the PWM signal generation units 35 are operated in the first control mode based on the mode setting signals S5 output from the respective mode determination circuits 38. As a result, the speed feedback control in the normal driving mode is performed.

On the other hand, in step S13, the control unit 3 sets the control mode to the second control mode. The PWM command units 33 and the PWM signal generation units 35 are operated in the second control mode based on the mode setting signals S5 output from the respective mode determination circuits 38. As a result, the overlapping adjustment is performed.

When the process in step S12 or step S13 ends, the series of processes ends.

Note that, in step S11, it may be determined whether the process proceeds to step S12 or step S13 based on a plurality of determination results corresponding to a plurality of periods of the speed command signal Sc. This makes it possible to prevent unintentional change of the control mode in a case where the speed command signal Sc is influenced by external factors or the like.

Figure 4:
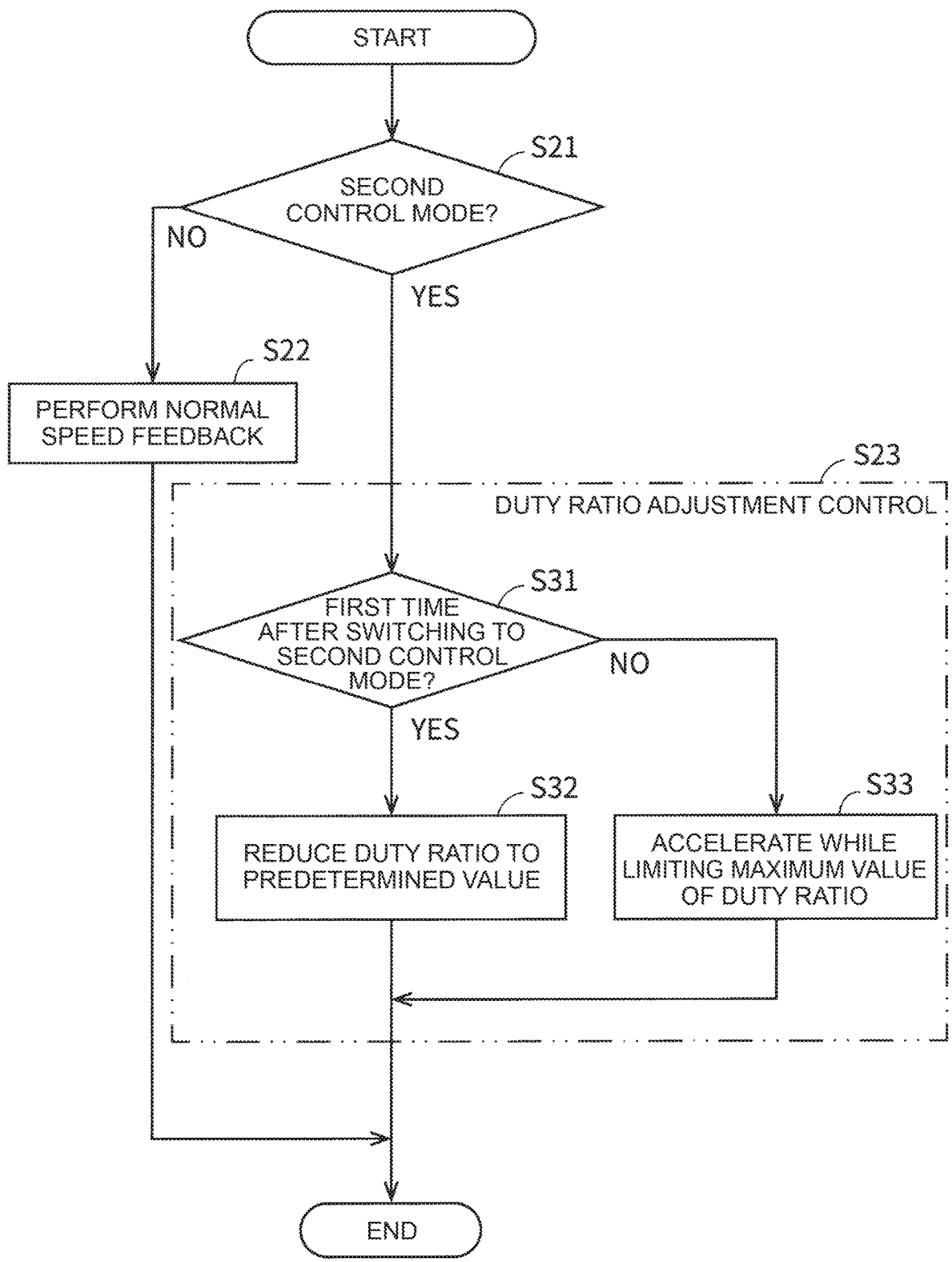
FIG. 4 is a second flowchart illustrating an example of a process performed by the control unit.

FIG. 4 is a second flowchart illustrating an example of a process performed by the control unit 3.

In FIG. 4, a flow of the process relating to the setting of the duty ratio of each of the PWM signals S4 (first PWM signal S4A and second PWM signal S4B) is illustrated. The process illustrated in FIG. 4 is periodically and repeatedly performed.

In step S21, each of the PWM command units 33 determines whether the control mode is the second control mode. When the control mode is not the second control mode (NO), the process proceeds to step S22. When the control mode is the second control mode (YES), the process proceeds to step S23.

In step S22, the duty ratio of each of the PWM signals S4 is set by the normal speed feedback control. More specifically, the PWM command units 33 set the duty ratios of the respective PWM signals S4 based on the target rotational speed signals S1 and the actual rotational frequency signals S2 such that the actual rotational speeds become equal to the target rotational speeds. When the process in step S22 ends, the series of processes ends.

On the other hand, in step S23, the duty ratio adjustment control is performed. As a result, in the second control mode, the duty ratio of each of the PWM signals S4 is set in a predetermined manner.

More specifically, in step S31, each of the PWM command units 33 determines whether the setting of the duty ratio of the corresponding PWM signal S4 is performed for the first time after the control mode is switched to the second control mode. In a case where the setting of the duty ratio of each of the PWM signals S4 is performed for the first time after the control mode is switched to the second control mode (YES), the process proceeds to step S32. Otherwise (NO), the process proceeds to step S33.

In step S32, the PWM command units 33 reduce the duty ratios of the respective PWM signals S4 to predetermined values. For example, the PWM command units 33 set the duty ratios of the respective PWM signals S4 to zero. As a result, the duty ratios of the respective PWM signals S4 output immediately after the control mode is switched to the second control mode are zero, which makes it possible to keep the sum of the power supply currents low.

On the other hand, in step S33, the PWM command units 33 limit the maximum values of the duty ratios of the respective PWM signals S4, and gradually increase the duty ratios of the respective PWM signals S4 to accelerate the motors 21 and 22. The PWM command units 33 set the duty ratios of the PWM signals S4 to values larger than the previously set duty ratios, for example, until the duty ratios of the PWM signals S4 reach the maximum values. This makes it possible to accelerate the motors 21 and 22 while suppressing the sum of the power supply currents. Note that it is desirable that the maximum values of the duty ratios of the respective PWM signals S4 be set to the maximum values allowing for the overlapping adjustment so as not to overlap a high period of the first PWM signal S4A and a high period of the second PWM signal S4B (or so as to overlap a high period of first PWM signal S4A and a high period of second PWM signal S4B within range where the sum of power supply currents is allowable). However, the maximum values are not limited to those values.

When the process in step S33 ends, the duty ratio adjustment control ends, and the series of processes ends.

Figure 5:
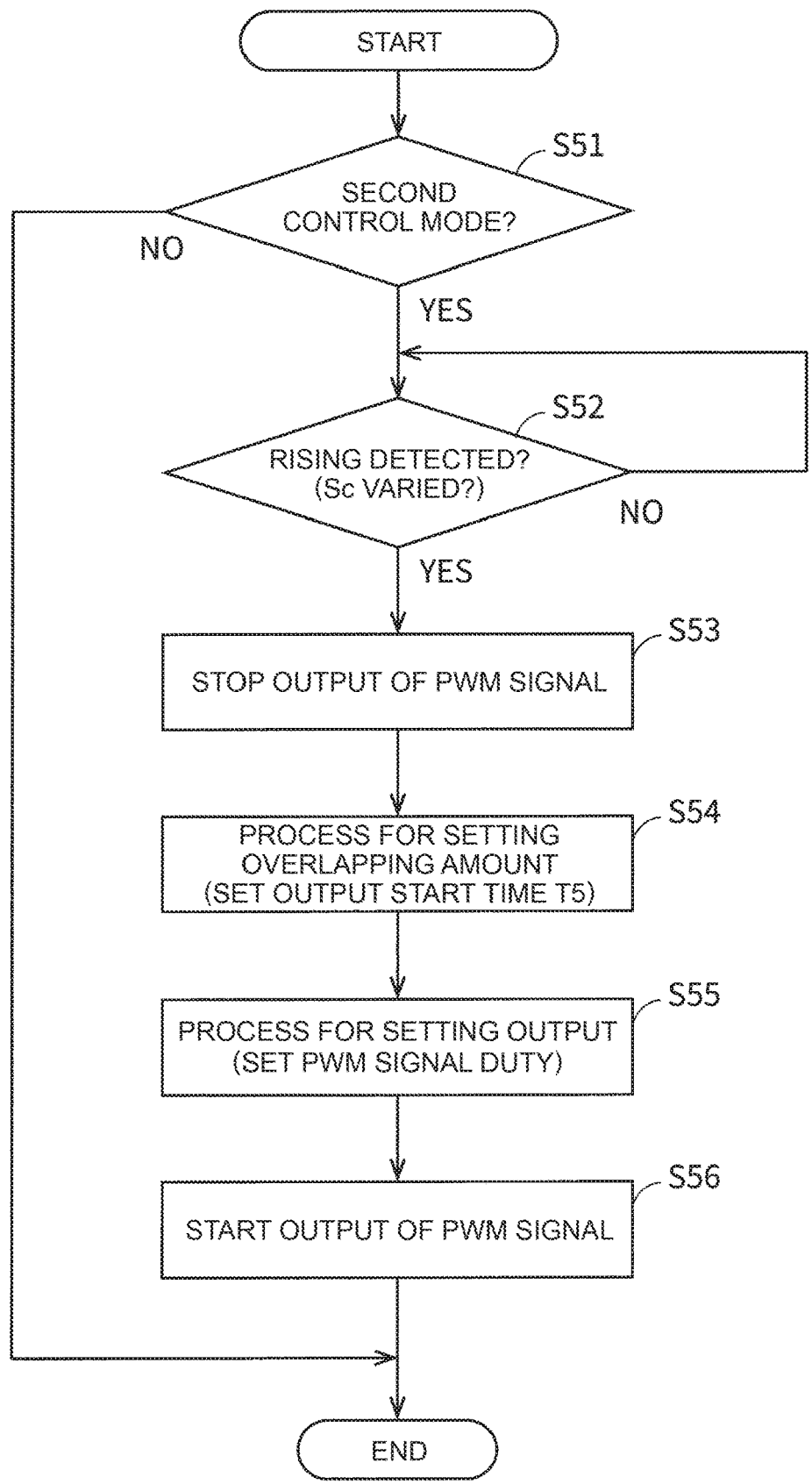
FIG. 5 is a third flowchart illustrating an example of a process performed by the control unit.

FIG. 5 is a third flowchart illustrating an example of a process performed by the control unit 3.

In FIG. 5, a flow of the process relating to the management of the rising timing of each of the PWM signals S4 is illustrated. The process illustrated in FIG. 5 is periodically and repeatedly performed.

In step S51, each of the PWM signal generation units 35 determines whether the control mode is the second control mode. When the control mode is not the second control mode (NO), the series of processes ends. At this time, the PWM signal generation units 35 output the PWM signals S4 based on the respective PWM setting instruction signals S3 without performing adjustment of the rising timing. In contrast, when the control mode is the second control mode (YES), the process proceeds to step S52.

In step S52, each of the PWM signal generation units 35 determines whether rising of the speed command signal Sc has been detected. When rising of the speed command signal Sc is not detected (NO), the process waits for detection of rising of the speed command signal Sc. When rising of the speed command signal Sc is detected (YES), the process proceeds to step S53.

In step S53, the PWM signal generation units 35 stop output of the PWM signals S4.

In step S54, the PWM signal generation units 35 perform a process for setting overlapping amount. The PWM signal generation units 35 set the time T5 from a reference time corresponding to a time when rising of the speed command signal Sc is detected until the output of the PWM signals S4 is started, for the first PWM signal S4A and the second PWM signal S4B, respectively.

In step S55, the PWM signal generation units 35 perform a process for setting output. The PWM signal generation units 35 performs setting to output the PWM signals S4 at the duty ratios set by the respective PWM command units 33 in the above-described manner.

In step S56, the PWM signal generation units 35 output the PWM signals S4. When the process in step S56 ends, the series of processes ends.

Figure 6:
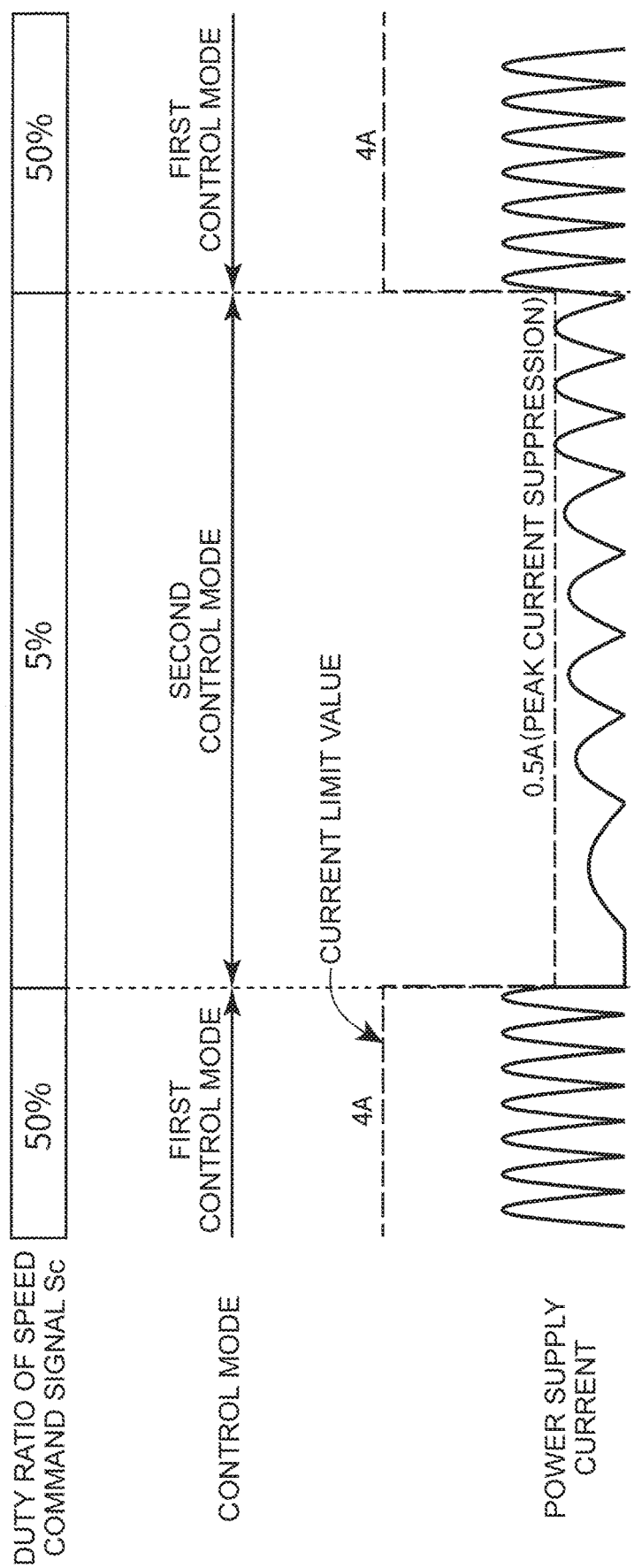
FIG. 6 is a first diagram schematically illustrating a magnitude of power supply currents flowing through motors according to the present embodiment.
Figure 7:
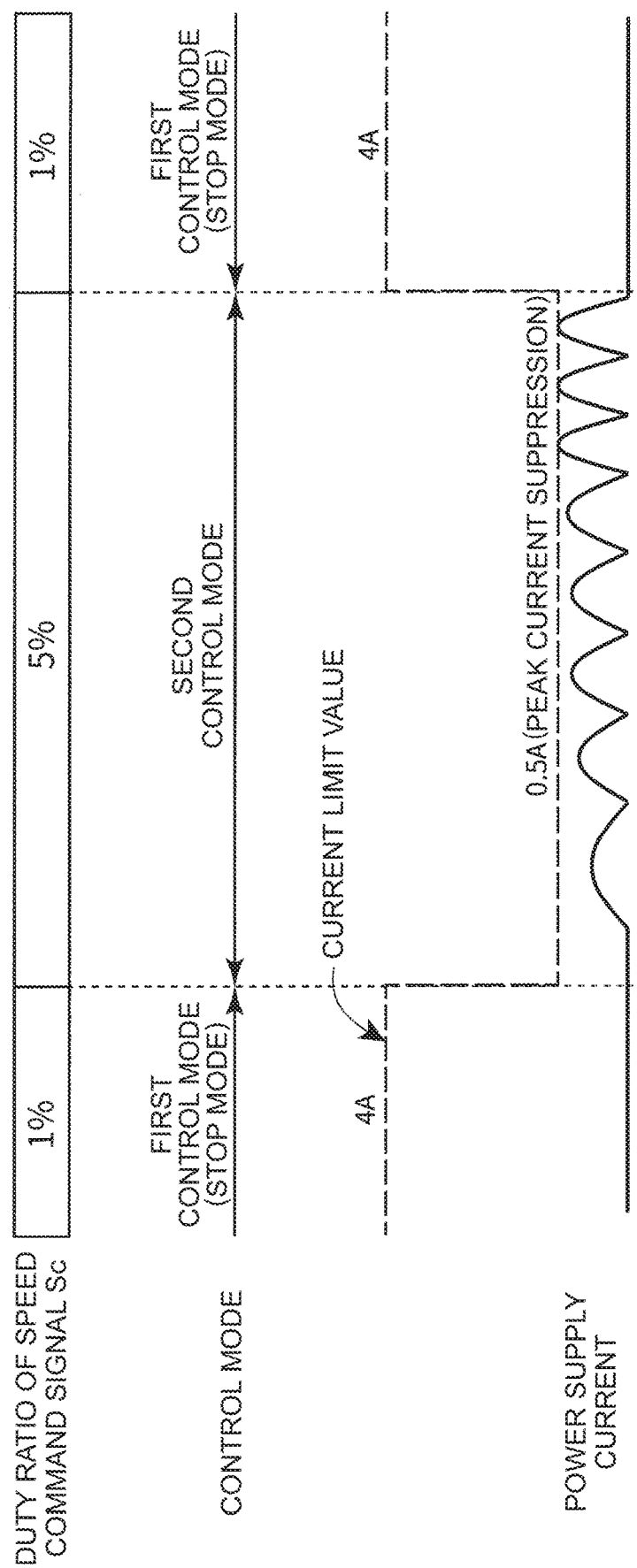
FIG. 7 is a second diagram schematically illustrating the magnitude of the power supply current flowing through the motors according to the present embodiment.

FIG. 6 is a first diagram schematically illustrating the magnitude of the power supply currents flowing through the motors 21 and 22 in the present embodiment. FIG. 7 is a second diagram schematically illustrating the magnitude of the power supply currents flowing through the motors 21 and 22 in the present embodiment.

In FIG. 6 and FIG. 7, the duty ratio of the speed command signal Sc, the control mode, and the waveform of the power supply current are schematically illustrated in order from an upper side. A dashed line illustrated together with the power supply current indicates the upper limit value (current limit value) of the sum of the power supply currents flowing through the first motor 21 and the second motor 22, which are set by the control unit 3.

FIG. 6 illustrates a case where the control mode is switched from the first control mode in which the motors 21 and 22 are normally rotated, to the second control mode, and is then returned to the first control mode again. In the first control mode, the upper limit value is set to 4 A, and the currents flow through the motors 21 and 22 based on the duty ratio of the speed command signal Sc unless the power supply currents exceed the upper limit value. Thereafter, when the control mode is switched to the second control mode, the upper limit value is set to 0.5 A, and the overlapping adjustment is started. Since the on period of the first PWM signal S4A and the on period of the second PWM signal S4B do not overlap with each other because of the overlapping adjustment, a peak of the power supply currents is suppressed at a low level. Further, even if the peak of the sum of the power supply currents rises, the peak does not exceed the upper limit value. Note that, when the control mode is switched to the second control mode, the duty ratio of each of the PWM signals S4 is set to a predetermined value (for example, zero), and then the duty ratio is gradually increased. Therefore, the power supply currents are reduced immediately after the control mode is switched to the second control mode. Thereafter, when the control mode is switched to the first control mode, the upper limit value is set to 4 A, and the currents flow through the motors 21 and 22 based on the duty ratio of the speed command signal Sc.

FIG. 7 illustrates a case where the control mode is switched from a state where the motors 21 and 22 are stopped (stop mode), to the second control mode, and is then returned to the state where the motors 21 and 22 are stopped again. When the duty ratio of the speed command signal Sc is a stop instruction duty (for example, 1%), the motors 21 and 22 are stopped and the control mode is the first control mode. At this time, the upper limit value is set to 4 A. Thereafter, when the duty ratio of the speed command signal Sc becomes 5%, the control mode is switched to the second control mode, the upper limit value is set to 0.5 A, and the overlapping adjustment is started. When the control mode is switched to the second control mode, the duty ratio of each of the PWM signals S4 is set to a predetermined value (for example, zero), and then gradually increased to rotate the motors 21 and 22. Thereafter, when the duty ratio of the speed command signal Sc becomes 1%, the control mode is switched to the first control mode, and the upper limit value is set to 4 A. As a result, the currents do not flow through the motors 21 and 22, and the motors 21 and 22 are stopped again.

Depending on a device or a system in which the fan 1 is used, it is desirable to suppress the sum of the power supply currents flowing through the whole of the device or the system, based on the driving state of the device or the system. For example, in a case where the power supply normally used is lost in the device or the system, the driving is shifted to driving using a battery as an auxiliary power supply. In a special driving state using such a battery, it is desirable to suppress the peak of the power supply current of the motor used in the device or the system to a prescribed value or less in order to enable the power supply to last as long as possible.

On the other hand, in a motor device in which a plurality of motors are used like the fan 1, when the on periods of the PWM signals driving the switching elements to supply power to the respective motors overlap with each other, the peak values of the power supply currents flowing through the motor device are overlapped, and may largely exceed the demanded upper limit value of the power supply currents.

Figure 8:
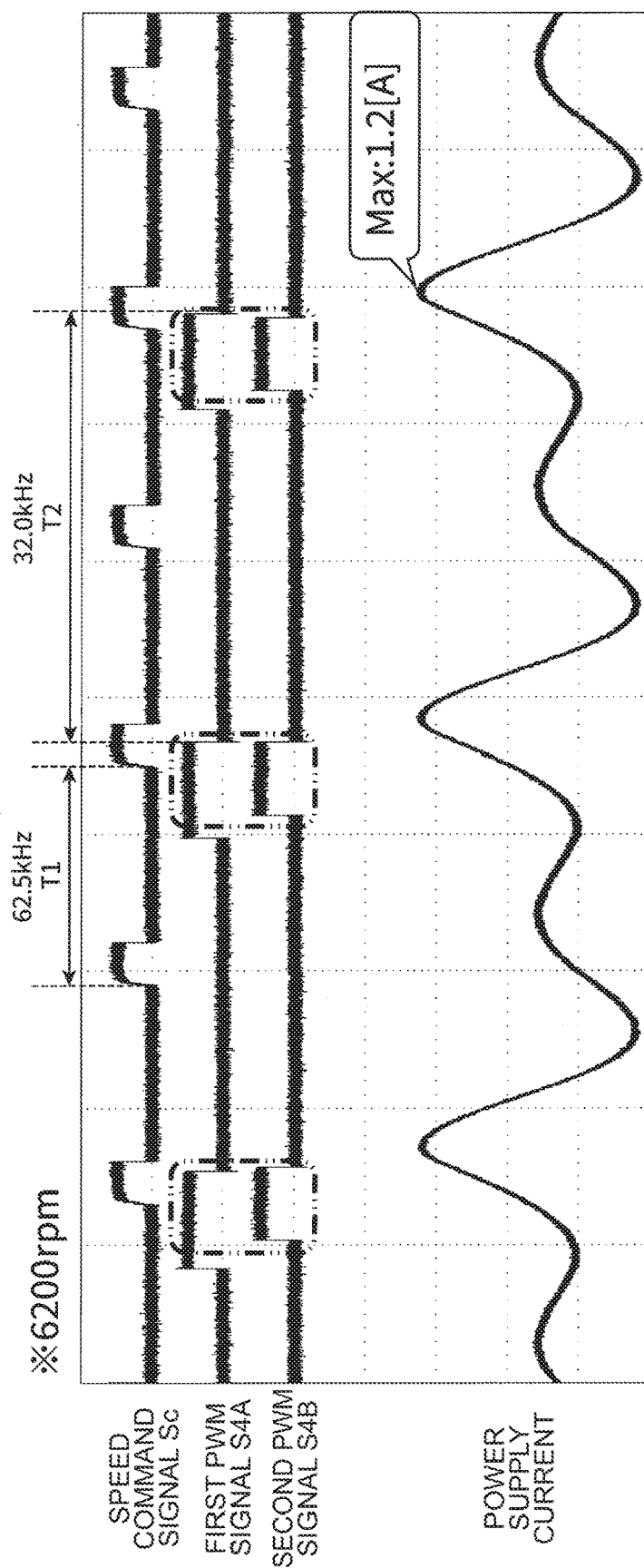
FIG. 8 is a first diagram explaining overlapping of on periods of PWM signals and the magnitude of the power supply currents.

FIG. 8 is a first diagram explaining overlapping of the on periods of the PWM signals and the magnitude of the power supply currents.

In FIG. 8, the waveform of the speed command signal Sc, the waveform of the first PWM signal S4A, the waveform of the second PWM signal S4B, and the waveform of the sum of the power supply currents flowing through the motors 21 and 22 in a case where, for example, the motors 21 and 22 are each rotated at 6200 rotations/min are illustrated in order from an upper side. As illustrated in FIG. 8, when the on period of the first PWM signal S4A and the on period of the second PWM signal S4B overlap with each other (in part surrounded by alternate long and two short dashes line in figure), the power supply current flowing through the first motor 21 and the power supply current flowing through the second motor 22 are accordingly increased at around the same time. Thus, the sum of the power supply currents flowing through the motors 21 and 22 is increased (in the illustrated example, value of the peak is about 1.2 A).

To meet the above-described demands, for example, a driving control method that constantly shifts phases of the pulses of the PWM signals is considered. However, it is difficult for a method for dispersing the pulses of the respective PWM signals with substantially equal intervals, to drive the motors at the rotational speeds as high as possible while surely suppressing the sum of the power supply currents to the predetermined current limit value or less in the special driving state using the battery or the like.

In contrast, in the present embodiment, in the special driving state, the speed command signal Sc with the duty ratio of 5% (specific example of predetermined mode switching condition) is input to the motor driving control device 110, which makes it possible to drive the two motors 21 and 22 in the second control mode. The duty ratio and the rising timing of each of the PWM signals S4 are adjusted and the overlapping adjustment of the on periods is performed so as to suppress the peak value of the power supply currents to a desired threshold or less based on the demanded current limit value. This makes it possible to suppress the sum of the power supply currents flowing through the motors 21 and 22. Further, in the second control mode, the PWM signals S4 are output at predetermined duty ratios irrespective of the duty ratio of the speed command signal Sc. Therefore, it is possible to drive the motors 21 and 22 at relatively high rotational speeds while suppressing the sum of the power supply currents flowing through the motors 21 and 22. For example, in a case where the fan 1 is used to cool an electronic device, even if the normal power supply is lost and the special driving state using the battery as the power supply is applied, it is possible to operate the fan 1 at higher effective current values while suppressing the power supply currents to within a prescribed limit.

The switching of the control mode from the first control mode to the second control mode can be easily performed by changing the duty ratio of the speed command signal Sc. Since the speed command signal Sc is used to synchronize the first PWM signal S4A with the second PWM signal S4B in the second control mode, the control in the second control mode can be more simply performed.

In the first control mode, the overlapping of the on periods of the PWM signals is not particularly considered. In other words, in the normal state, the complicated control to shift the phases of the pulses of the PWM signals is not performed. This makes it possible to reduce an amount of information processed by the control unit 3.

Figure 9:
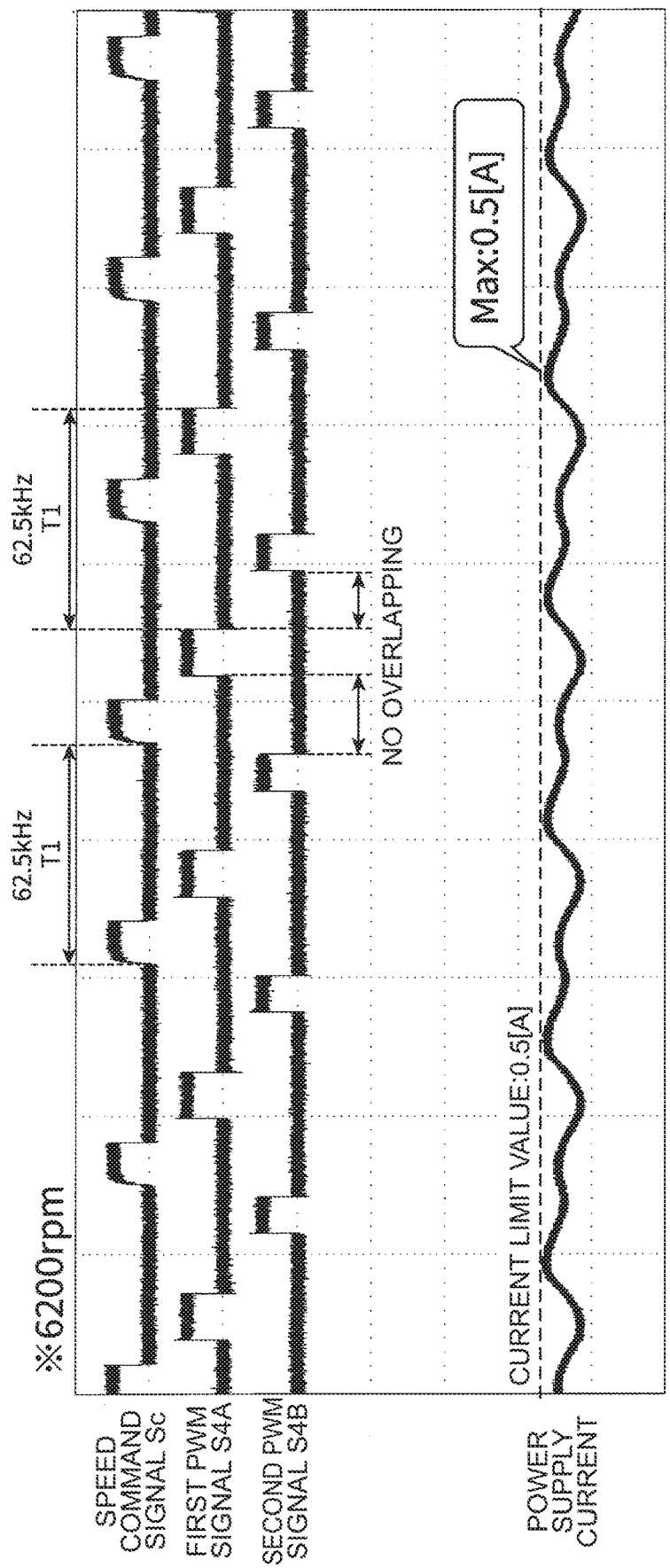
FIG. 9 is a second diagram that explains overlapping of the on periods of the PWM signals and the magnitude of the power supply currents.

FIG. 9 is a second diagram that explains overlapping of the on periods of the PWM signals and the magnitude of the power supply currents.

Also in FIG. 9, the waveform of the speed command signal Sc, the waveform of the first PWM signal S4A, the waveform of the second PWM signal S4B, and the waveform of the sum of the power supply currents flowing through the motors 21 and 22 in the case where, for example, the motors 21 and 22 are each rotated at 6200 rotations/min are illustrated in order from an upper side. In FIG. 9, the case where the motors 21 and 22 are driven in the second control mode is illustrated. In other words, the overlapping adjustment is performed such that the on period of the first PWM signal S4A and the on period of the second PWM signal S4B do not overlap with each other. When the on period of the first PWM signal S4A and the on period of the second PWM signal S4B do not overlap with each other as described above, the power supply current flowing through the first motor 21 and the power supply current flowing through the second motor 22 are increased at different times. Accordingly, the sum of the power supply currents of the motors 21 and 22 is suppressed at a low level (in the illustrated example, value of the peak is suppressed to about 0.5 A).

In the case of performing the overlapping adjustment, it is preferable to perform the adjustment such that the phase of the power supply current flowing through the first motor 21 and the phase of the power supply current flowing through the second motor 22 are opposite in phase to each other.

Figure 10:
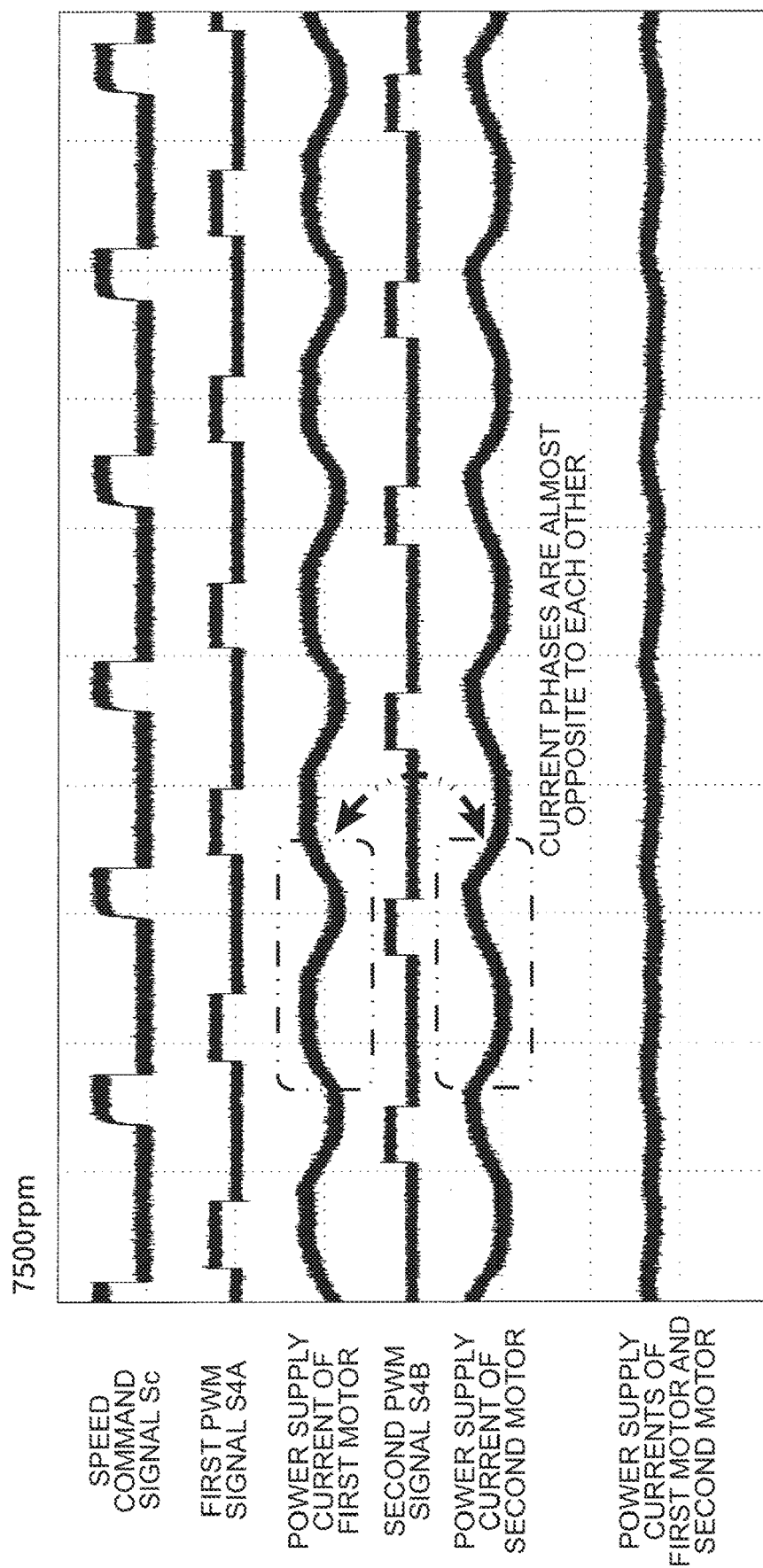
FIG. 10 is a third diagram that explains overlapping of the on periods of the PWM signals and the magnitude of the power supply currents.

FIG. 10 is a third diagram that explains overlapping of the on periods of the PWM signals and the magnitude of the power supply currents.

In FIG. 10, the waveform of the speed command signal Sc, the waveform of the first PWM signal S4A, the waveform of the power supply current of the first motor 21, the waveform of the second PWM signal S4B, the waveform of the power supply current of the second motor 22, and the waveform of the sum of the power supply currents of the motors 21 and 22 in a case where, for example, the motors 21 and 22 are each rotated at 7500 rotations/min are illustrated in order from an upper side. FIG. 10 illustrates the case where the motors 21 and 22 are driven in the second control mode, and the rising timing and the duty ratio of each of the PWM signals S4 are set such that the waveforms of the power supply currents of the two motors 21 and 22 are opposite in phase to each other. In this case, it is possible to smooth a synthesized waveform of the power supply currents of the motors 21 and 22, and to keep the maximum value of the synthesized power supply current low.

Description of Variant

Hereinafter, a variant of the present embodiment is described. In the following description, components substantially similar to the components in the present embodiment are denoted by the same reference numerals, and description of such components is omitted in some cases.

In the second control mode, synchronization of the first PWM signal with the second PWM signal may be performed with one of the first PWM signal and the second PWM signal as a reference. In other words, the control unit 3 may perform the overlapping-related adjustment by synchronizing one of the first PWM signal and the second PWM signal with the other signal in the second control mode.

Figure 11:
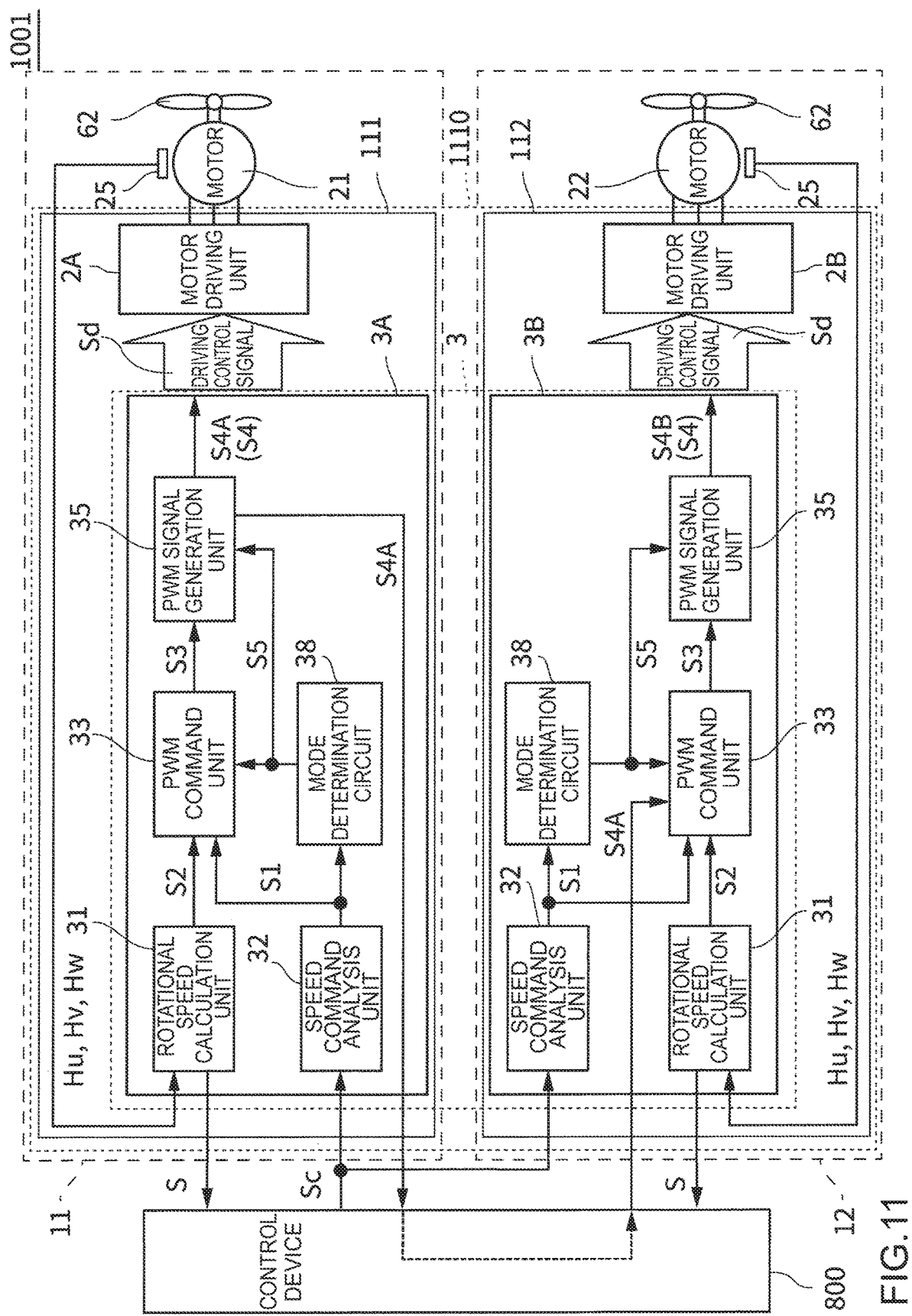
FIG. 11 is a block diagram illustrating a configuration of a fan according to a variant of the present embodiment.

FIG. 11 is a block diagram illustrating a configuration of a fan 1001 according to one of the variants of the present embodiment.

As illustrated in FIG. 11, in a motor driving control device 1110 of the fan 1001, the first PWM signal S4A is output from the PWM signal generation unit 35 of the first control unit 3A to the control device 800, and the first PWM signal S4A is input as is from the control device 800 to the PWM command unit 33 of the second control unit 3B.

In the present variant, for example, the fact that the speed command signal Sc has a prescribed level is defined as the predetermined mode switching condition. More specifically, the fact that the speed command signal Sc is at a low level or a high level (namely, the duty ratio of the speed command signal Sc is 0% or 100%) is defined as the predetermined mode switching condition. Each of the mode determination circuits 38 determines whether the speed command signal Sc meets the predetermined mode switching condition. Note that it is possible to determine whether the speed command signal Sc is a signal having a prescribed level, for example, by detecting lapse of a first predetermined time after start of an off period (falling of speed command signal Sc). Further, it is possible to determine whether the speed command signal Sc is not a signal having a prescribed level, for example, from the start of the on period (rising of speed command signal Sc) with the predetermined duty ratio while the off period is continued and lapse of a second predetermined time after the start of the on period. Note that one of the low level and the high level of the speed command signal Sc may be defined as the predetermined mode switching condition. Further, the specific method for determining whether the speed command signal Sc is the signal having the prescribed level is not limited to the above-described method.

In the present embodiment, in a case where each of the mode determination circuits 38 determines that the speed command signal Sc has the prescribed level (in case where each of the mode determination circuits 38 determines that the duty ratio of the speed command signal Sc is 0%), based on the corresponding target rotational speed signal S1, the mode determination circuits 38 output the respective mode setting signals S5 corresponding to the second control mode. In contrast, in a case where each of the mode determination circuits 38 determines that the speed command signal Sc does not have the prescribed level (in a case where each of the mode determination circuits 38 does not determine that the duty ratio of the speed command signal Sc is 0%), based on the corresponding target rotational speed signal S1, the mode determination circuits outputs the respective mode setting signals S5 corresponding to the first control mode.

The PWM command units 33 and the PWM signal generation units 35 are operated in any of the first control mode and the second control mode indicated by the mode setting signals S5, based on the mode setting signals S5.

In the first control mode, the PWM command units 33 and the PWM signal generation units 35 perform speed feedback control of the motors 21 and 22 based on the actual rotational frequency signals S2 and the target rotational speed signals S1 as described above. At this time, the first control unit 3A and the second control unit 3B perform the speed feedback control without synchronizing the first PWM signal S4A with the second PWM signal S4B.

In contrast, in the second control mode, the PWM command units 33 and the PWM signal generation units 35 perform the overlapping control and output the first PWM signal S4A and the second PWM signal S4B. At this time, in the present variant, the PWM command unit 33 and the PWM signal generation unit 35 of the second control unit 3B perform the overlapping adjustment by synchronizing the second PWM signal S4B with the first PWM signal S4A. In other words, the control unit 3 performs the overlapping adjustment by synchronizing the second PWM signal S4B with the first PWM signal S4A.

Further, in the second control mode, the PWM command units 33 and the PWM signal generation units 35 perform the overlapping adjustment by adjusting the rising timing (on timing) and the duty ratio of each of the first PWM signal S4A and the second PWM signal S4B. Such overlapping adjustment is performed based on the period of the speed command signal Sc and a predetermined delay time with respect to a pulse of the speed command signal Sc as described below.

Figure 12:
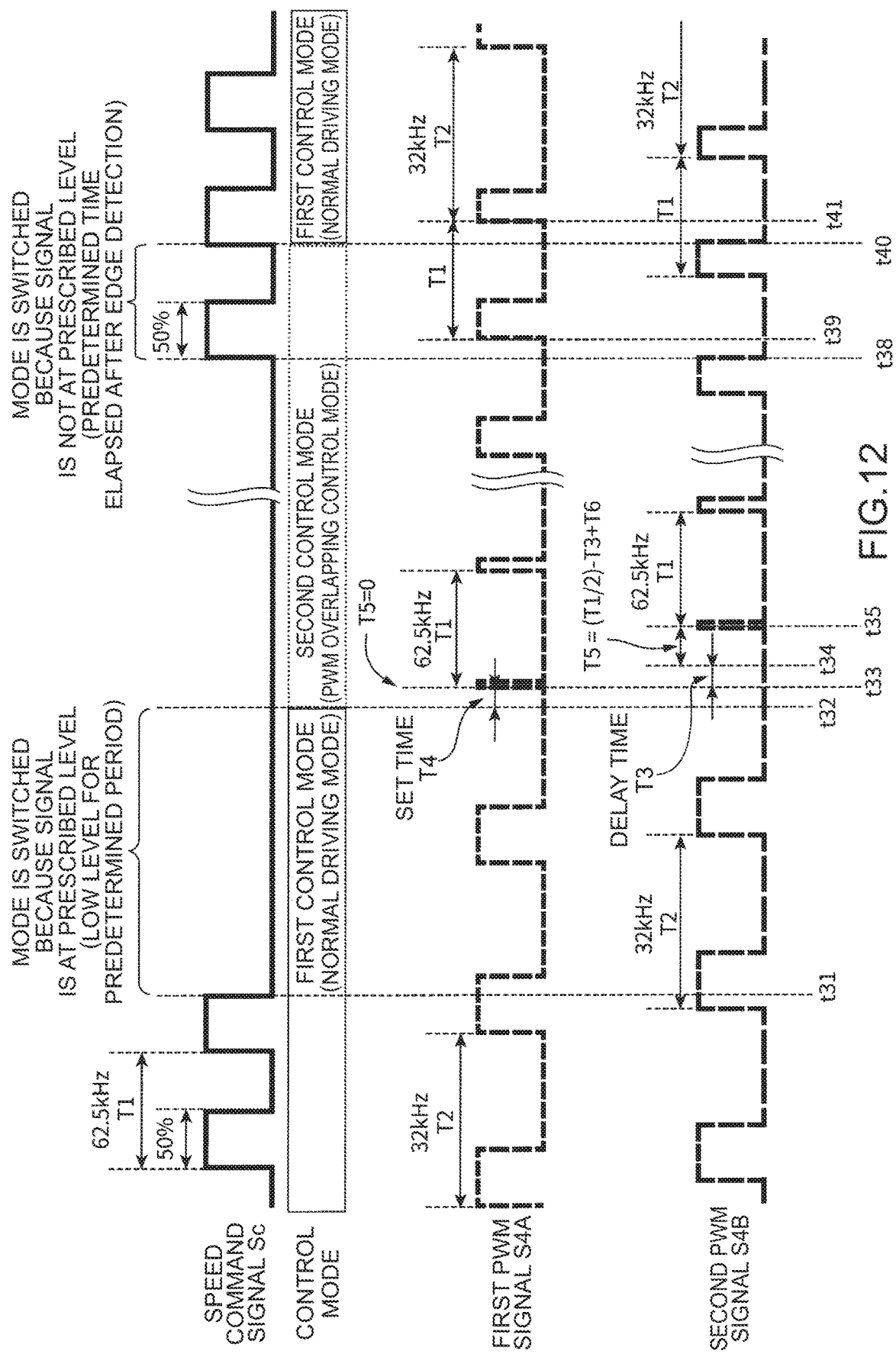
FIG. 12 is a timing chart explaining an operation example of a control unit according to the present variant.

FIG. 12 is a timing chart to explain an operation example of the control unit 3 according to the present variant.

In FIG. 12, as with FIG. 2, the waveform of the speed command signal Sc, the control mode of the control unit 3, the waveform of the first PWM signal S4A, and the waveform of the second PWM signal S4B are schematically illustrated in order from an upper side.

As illustrated in FIG. 12, the period T1 of the speed command signal Sc is, for example, 62.5 kHz. For example, when the duty ratio of the speed command signal Sc is about 50% as with the duty ratio before time t31, the speed command signal Sc does not meet the predetermined mode switching condition, and the control unit 3 is operated in the first control mode.

In the example illustrated in FIG. 12, the speed command signal Sc is at the low level after falling of the speed command signal Sc is detected at time t31 until time t32 after lapse of a predetermined time (first predetermined time) from time t31. Thus, each of the mode determination circuits 38 determines that the speed command signal Sc meets the predetermined mode switching condition (speed command signal Sc has prescribed level), and the control unit 3 is operated in the second control mode. Note that the first predetermined time is set to, for example, a time longer than the period T1 of the speed command signal Sc.

In the second control mode, the second control unit 3B outputs the second PWM signal S4B with the rising timing of the first PWM signal S4A along with output of the first PWM signal S4A by the first control unit 3A as a reference. In other words, in the second control mode, the second PWM signal S4B is output in synchronization with the first PWM signal S4A. The first control unit 3A and the second control unit 3B respectively set the period of the first PWM signal S4A and the period of the second PWM signal S4B to the period T1 of the speed command signal Sc. However, the periods are not limited to the period T1. In the second control mode, the period of each of the first PWM signal S4A and the second PWM signal S4B may still be the period T2, or may be different from both the period T1 and the period T2.

As with the above-described embodiment, in the second control mode, the PWM command units 33 determines the duty ratios of the respective PWM signals S4 to predetermined values, irrespective of the duty ratio of the speed command signal Sc.

In the present variant, the PWM signal generation units 35 outputs the first PWM signal S4A and the second PWM signal S4B by adjusting the rising timing of the first PWM signal S4A and the second PWM signal S4B based on the period T1, the predetermined delay time T4 from time t32 when the control mode is switched to the second control mode, and the delay time T3 with respect to the pulse of the first PWM signal S4A. Further, the PWM signal generation unit 35 of the second control unit 3B adjusts the rising timing of the second PWM signal S4B in consideration of the predetermined adjustment time T6. Note that the delay time T3 is a time caused by operation for signal processing and the like, and is previously set as a known time in the PWM signal generation units 35.

When the control mode is switched to the second control mode at time t32, the PWM signal generation unit 35 of the first control unit 3A performs adjustment such that the rising timing of the first PWM signal S4A comes at time t33 after the predetermined time T4 has elapsed from time t3, with time t32 as a reference. In other words, the period T5 from time t33 to the rising timing of the first PWM signal S4A is zero.

On the other hand, the PWM signal generation unit 35 of the second control unit 3B adjusts the rising timing of the second PWM signal S4B in the following manner based on the rising timing of the first PWM signal S4A. The PWM signal generation unit 35 of the second control unit 3B can detect the rising timing of the first PWM signal S4A at time t34 after the delay time T3 has elapsed from time t33 when the first PWM signal S4A rises. The PWM signal generation unit 35 of the second control unit 3B performs adjustment such that the rising timing of the second PWM signal S4B comes at time t35 delayed from time t34 by the period T5 calculated by a predetermined calculation expression, with time t34 as a reference. The period T5 from time t34 to the rising timing of the second PWM signal S4B is not zero, and the rising timing of the second PWM signal S4B and the rising timing of the first PWM signal S4A are shifted by a time obtained by adding the period T5 and the delay time T3.

The period T5 is determined by the following calculation expression. In other words, the period T5 is calculated from the calculation expression that includes the period T1 of the speed command signal Sc, the delay time T3, and the predetermined adjustment time T6 as parameters.

$$T5=(T1/2)-T3+T6$$

In the present variant, the duty ratio of each of the first PWM signal S4A and the second PWM signal S4B and the predetermined adjustment time T6 are set such that the on period of the first PWM signal S4A and the on period of the second PWM signal S4B do not overlap with each other. As described above, in the present variant, after the control mode is switched to the second control mode, the second PWM signal S4B is synchronized with the first PWM signal S4A, and the overlapping adjustment is performed such that the on period of the first PWM signal S4A and the on period of the second PWM signal S4B do not overlap with each other.

Note that, also in the present variant, when the control mode is switched to the second control mode, the duty ratio of the first PWM signal S4A and the duty ratio of the second PWM signal S4B are both gradually increased from the predetermined values and the overlapping adjustment is performed. However, the operation is not limited to the above.

A case where the duty ratio of the speed command signal Sc is changed to, for example, 50%, and the speed command signal Sc rises at time t38 while the operation in the second control mode is performed as described above, is assumed. In this case, each of the mode determination circuits 38 determines that the speed command signal Sc does not meet the predetermined mode switching condition at time t40 after a predetermined time (second predetermined time) has elapsed from time t38. As a result, the control unit 3 is operated in the first control mode from time t40. The second predetermined time may be set to, for example, a time that is the same as or different from the period T1 of the speed command signal Sc.

When the control mode is returned to the first control mode, the first control unit 3A and the second control unit 3B each output the corresponding PWM signal S4, the period T2 of which is 32 kHz, based on the duty ratio of the speed command signal Sc. At this time, in the case of the first PWM signal S4A in which the rising timing comes at time t39 after time t38 and before time t40, the next rising timing comes at time t41 after the period T1 has elapsed from time t39. However, the control mode is returned to the first control mode at time t41, and the rising timing thereafter is accordingly adjusted so as to come every period T2. The second PWM signal S4B is adjusted in a similar manner. The second PWM signal S4B is adjusted such that the rising timing comes every period T2 after the rising timing comes at time t40. Note that the timing when the period of the rising timing of the PWM signals S4 are adjusted to the periods in the first control mode is not limited to the above-described timing, and the rising timing may be adjusted to a time, for example, after a predetermined period has elapsed after it is determined that the speed command signal Sc does not meet the predetermined mode switching condition.

Figure 13:
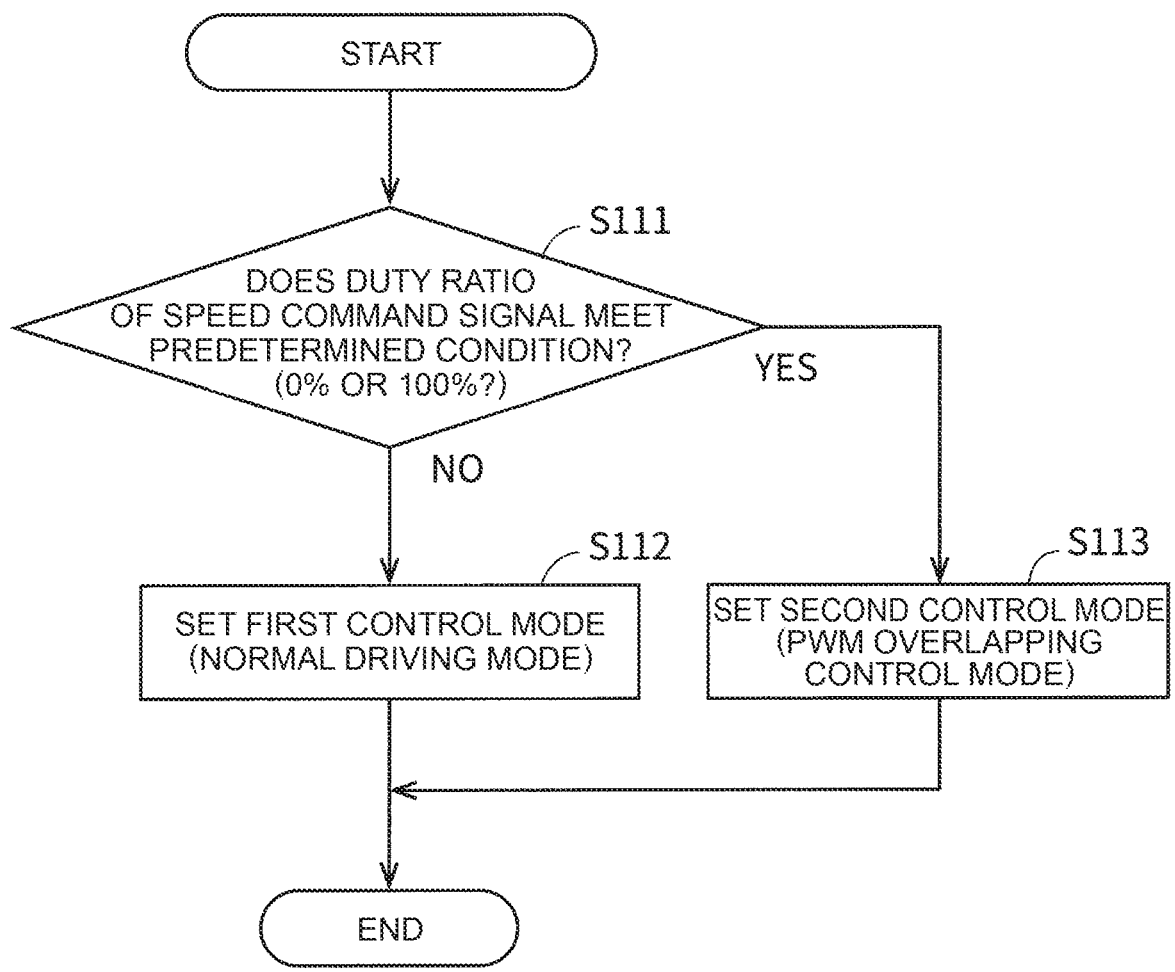
FIG. 13 is a flowchart illustrating an example of a process performed by the control unit according to the present variant.

FIG. 13 is a flowchart illustrating an example of a process performed by the control unit 3 according to the present variant.

In FIG. 13, a flow of the process relating to the setting of the control mode in the present variant is illustrated, as with the flowchart illustrated in FIG. 3 according to the above-described embodiment.

In step S111, each of the mode determination circuits 38 determines whether the duty ratio of the speed command signal Sc meets the predetermined mode switching condition. In other words, each of the mode determination circuits 38 determines whether the duty ratio of the speed command signal Sc is 0% or 100%. When the duty ratio of the speed command signal Sc is 0% or 100% (YES), the process proceeds to step S113. Otherwise (NO), the process proceeds to step S112.

In step S112, the control unit 3 sets the control mode to the first control mode. On the other hand, in step S113, the control unit 3 sets the control mode to the second control mode. When the process in step S112 or step S113 ends, the series of processes ends.

Figure 14:
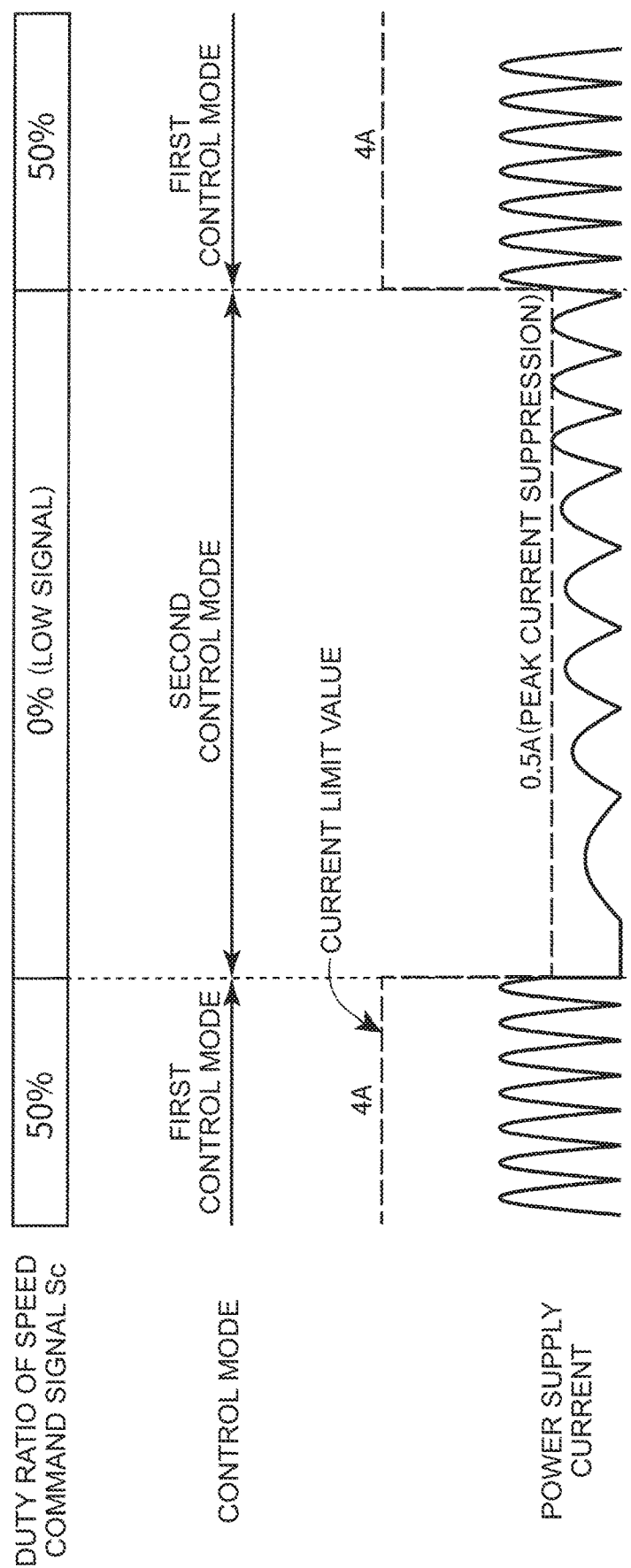
FIG. 14 is a first diagram schematically illustrating a magnitude of power supply currents flowing through motors according to the present variant.
Figure 15:
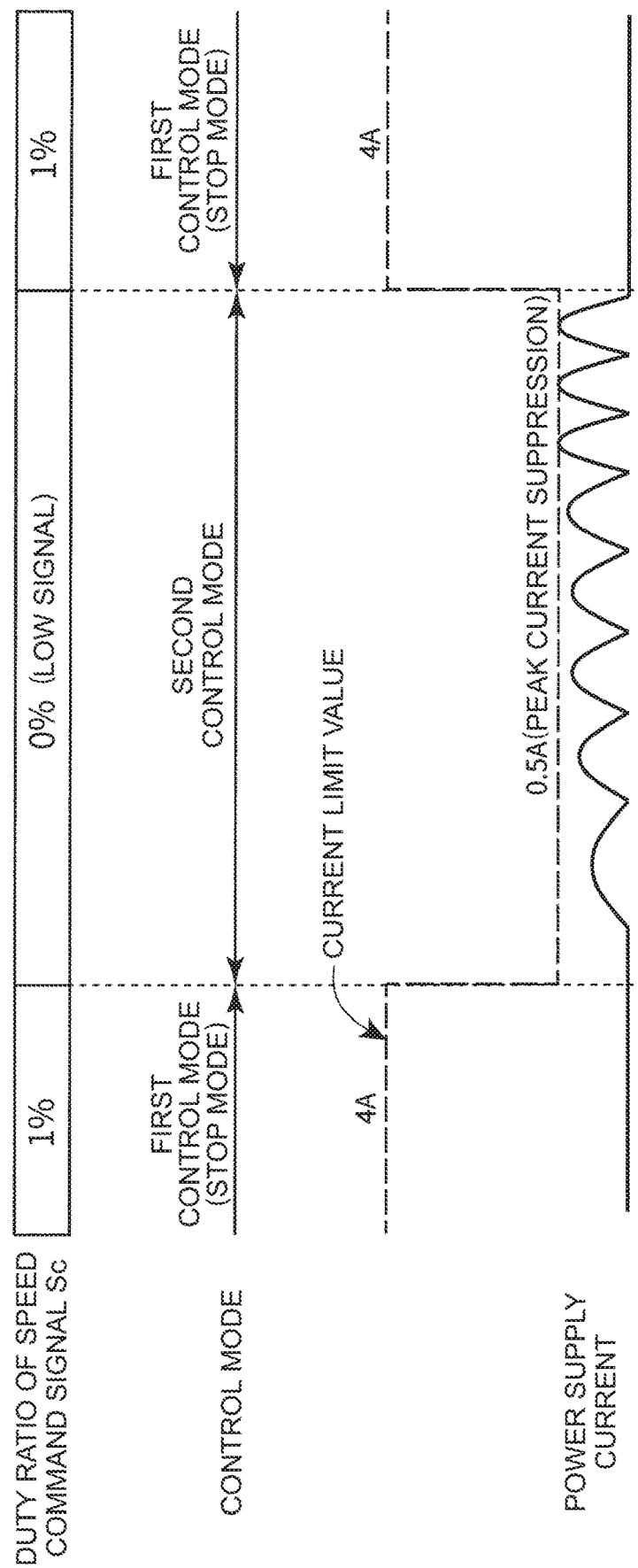
FIG. 15 is a second diagram schematically illustrating the magnitude of the power supply currents flowing through the motors according to the present variant.

FIG. 14 is a first diagram schematically illustrating the magnitude of the sum of the power supply currents flowing through the motors 21 and 22 according to the present variant. FIG. 15 is a second diagram schematically illustrating the magnitude of the power supply currents flowing through the motors 21 and 22 according to the present variant.

FIG. 14 and FIG. 15 are illustrated in the same format as the format of FIG. 6 and FIG. 7. FIG. 14 illustrates the case where the control mode is switched from the first control mode in which the motors 21 and 22 are normally rotated, to the second control mode, and is then returned to the first control mode again. In the first control mode, the upper limit value (current limit value) of the sum of the power supply currents is set to 4 A, and the currents flow through the motors 21 and 22 based on the duty ratio of the speed command signal Sc unless the sum of the power supply currents exceeds the upper limit value. Thereafter, when the duty ratio of the speed command signal Sc is changed from 50% to 0%, the control mode is switched to the second control mode, the upper limit value is set to 0.5 A, and the power supply currents are suppressed at a low level. Thereafter, when the duty ratio of the speed command signal Sc is changed to 50%, the control mode is switched to the first control mode, the upper limit value is set to 4 A, and the currents flow through the motors 21 and 22 based on the duty ratio of the speed command signal Sc.

FIG. 15 illustrates the case where the control mode is switched from a state (stop mode) where the motors 21 and 22 are stopped, to the second control mode, and is then returned to the state where the motors 21 and 22 are stopped again. When the duty ratio of the speed command signal Sc is a stop instruction duty (for example, 1%), the motors 21 and 22 are stopped and the control mode is the first control mode. At this time, the upper limit value (current limit value) of the sum of the power supply currents is set to 4 A. Thereafter, when the duty ratio of the speed command signal Sc becomes 0%, the control mode is switched to the second control mode, the upper limit value is set to 0.5 A, and the overlapping adjustment is started. Thereafter, when the duty ratio of the speed command signal Sc becomes the stop instruction duty, the control mode is switched to the first control mode again, and the upper limit value is set to 4 A. As a result, the currents do not flow through the motors 21 and 22, and the motors 21 and 22 are stopped.

Also in the present variant, effects similar to the effects in the above-described embodiment are achievable. In the present variant, the prescribed level of the speed command signal Sc is defined as the predetermined mode switching condition. Accordingly, when the motors 21 and 22 are driven in the first control mode in the normal state, the duty ratio of the speed command signal Sc can be appropriately set within a wide range.

Others

The circuit configuration of the blower and the motor driving control device configuring the fan is not limited to the circuit configuration illustrated in the above-described embodiment. Various circuit configurations configured to meet the object of the present disclosure are applicable. The blower and the motor driving control device may be configured by a combination of some of the features in the above-described embodiment. In the above-described embodiment, some components may not be provided, or some components may be configured in the other form.

The fan may not be connected to the control device. For example, two motor driving control units may be operated based on a single speed command signal output from an output unit provided in the motor driving control device.

The overlapping adjustment of the on periods of the two PWM signals may be performed also in the first control mode. In other words, the adjustment is performed in the second control mode such that the overlapping amount of the on period of the first PWM signal and the on period of the second PWM signal becomes smaller than the overlapping amount when the operation is performed in the first control mode.

The switching of the control mode may be performed using a signal different from the speed command signal as the condition designation signal. Further, the synchronization of the first PWM signal with the second PWM signal in the second control mode may be performed based on a signal different from the signal used as the condition designation signal, such as the speed command signal. For example, the two PWM signals may be synchronized based on a periodic pulse signal. The control mode may be switched using the condition designation signal that designates the control mode based on a magnitude of a voltage.

The control mode may be switched as with the above-described embodiment, and the synchronization of the first PWM signal with the second PWM signal may be performed with one of the first PWM signal and the second PWM signal as a reference in the second control mode as with the above-described variant.

The fan may include a first blower and a second blower that are disposed so as not to be aligned in the center of the rotation axis. Further, at least one of the first blower and the second blower may not be an axial flow fan. The fan may include three or more blowers. The motor driving control device and the motor driving control method are not limited to the motor driving control device and the motor driving control method used for the fan. The number of motors driven by the motor driving control device is not limited to two.

The motor driven by the motor driving control device according to the present embodiment is not limited to a three-phase brushless motor, and may be a motor having the other number of phases or a motor of the other type. As the energization method for each motor, 120-degree energization method can be adopted. However, the other energization method (for example, 150-degree energization method) may be adopted. The number of Hall elements is not limited to three. The position detection signal of the motor may be acquired using a detector different from the Hall element. For example, a Hall IC may be used. Further, the motor may be driven by a sensorless system without using a position detector such as a Hall element and a Hall IC.

Each of the above-described flowcharts and the like illustrates an example for description of the operation, and is not limited to the described flowchart. The steps illustrated in each of the flowcharts are specific examples, and are not limited to the flow. For example, the order of the steps may be changed, the other process may be inserted between the steps, or the process may be performed in parallel.

A part or all of the process in the above-described embodiment may be performed by software or by using a hardware circuit. For example, the control unit is not limited to a microcomputer. The configuration inside the control unit may be at least partially processed by software.

The above-described embodiment is considered to be illustrative in all respects and not restrictive. The scope of the present disclosure is defined by the appended claims rather than the above description. All changes or modifications made from the spirit and scope of the disclosure and equivalents thereof should be construed as falling within the scope of the disclosure.

What is claimed is:

1. A motor driving control device that drives each of a first motor and a second motor based on a predetermined condition designation signal, the motor driving control device comprising:
a control unit configured to output a first PWM (pulse width modulation) signal to control driving of the first motor and a second PWM signal to control driving of the second motor;
a first motor driving unit configured to flow a current through the first motor based on the first PWM signal; and
a second motor driving unit configured to flow a current through the second motor based on the second PWM signal, wherein
the control unit includes
a determination means configured to determine whether the condition designation signal meets a predetermined mode switching condition, and
an adjustment means configured to perform overlapping-related adjustment of an on period of the first PWM signal and an on period of the second PWM signal, based on a determination result of the determination means, wherein
the control unit operates in a first control mode in a case where the determination means does not determine that the condition designation signal meets the mode switching condition, and operates in a second control mode in a case where the determination means determines that the condition designation signal meets the mode switching condition, and
in the second control mode the adjustment means performs the overlapping-related adjustment so that an overlapping amount of the on period of the first PWM signal and the on period of the second PWM signal is smaller than an overlapping amount in a case where the operation is performed in the first control mode.

2. The motor driving control device according to claim 1, wherein
the control unit further includes an upper limit setting means configured to set an upper limit value of a sum of the current flowing through the first motor and the current flowing through the second motor, and
the upper limit setting means sets the upper limit value in the case where the operation is performed in the second control mode to a value lower than the upper limit value in the case where the operation is performed in the first control mode.

3. The motor driving control device according to claim 2, wherein, when the operation is performed in the second control mode, the adjustment means performs the overlapping-related adjustment so that the sum of the current flowing through the first motor and the current flowing through the second motor is lower than the upper limit value set by the upper limit setting means.

4. The motor driving control device according to claim 3, wherein, when the control mode is switched from the first control mode to the second control mode, the control unit reduces a duty ratio of the first PWM signal and a duty ratio of the second PWM signal to predetermined values, and then increases the duty ratio of the first PWM signal and the duty ratio of the second PWM signal to perform the overlapping-related adjustment.

5. The motor driving control device according to claim 1, further comprising a speed detection means configured to detect a rotational speed of the first motor and a rotational speed of the second motor, respectively, wherein
when control operation is performed in the first control mode, the control unit performs feedback control of the rotational speed of the first motor and the rotational speed of the second motor based on a detection result of the speed detection means, and
when the control operation is performed in the second control mode, the control unit does not perform the feedback control.

6. The motor driving control device according to claim 1, wherein the adjustment means performs the overlapping-related adjustment by adjusting rising timing and a duty ratio of each of the first PWM signal and the second PWM signal.

7. The motor driving control device according to claim 1, wherein the adjustment means performs the overlapping-related adjustment by synchronizing one of the first PWM signal and the second PWM signal with the other signal.

8. The motor driving control device according to claim 7, wherein the mode switching condition is a prescribed level of the condition designation signal.

9. A motor driving control device that drives each of a first motor and a second motor based on a predetermined condition designation signal, the motor driving control device comprising:
a control unit configured to output a first PWM (pulse width modulation) signal to control driving of the first motor and a second PWM signal to control driving of the second motor;
a first motor driving unit configured to flow a current through the first motor based on the first PWM signal; and
a second motor driving unit configured to flow a current through the second motor based on the second PWM signal, wherein
the control unit includes
a determination means configured to determine whether the condition designation signal meets a predetermined mode switching condition, and
an adjustment means configured to perform overlapping-related adjustment of an on period of the first PWM signal and an on period of the second PWM signal, based on a determination result of the determination means, wherein
the condition designation signal is a pulse signal,
the adjustment means performs the overlapping-related adjustment by synchronizing the first PWM signal and the second PWM signal with the condition designation signal, and
the adjustment means adjusts rising timing of each of the first PWM signal and the second PWM signal based on a period of the condition designation signal and a predetermined delay time to a pulse of the condition designation signal.

10. The motor driving control device according to claim 9, wherein the mode switching condition is a condition relating to at least one of a period and a duty ratio of the condition designation signal.

11. The motor driving control device according to claim 1, wherein the condition designation signal is a speed command signal that indicates a target rotational speed of the first motor and a target rotational speed of the second motor.

12. A motor driving control method to drive each of a first motor and a second motor based on a predetermined condition designation signal with use of a first motor driving unit configured to flow a current through the first motor based on a first PWM signal to control driving of the first motor, and a second motor driving unit configured to flow a current through the second motor based on a second PWM signal to control driving of the second motor, the motor driving control method comprising:

determining whether the condition designation signal meets a predetermined mode switching condition; and performing overlapping-related adjustment of an on period of the first PWM signal and an on period of the second PWM signal, based on a determination result of the determining step, wherein the method further comprises operating in a first control mode in a case where the determination step does not determine that the condition designation signal meets the mode switching condition, and operating in a second control mode in a case where the determination step determines that the condition designation signal meets the mode switching condition, and in the second control mode the adjustment step performs the overlapping-related adjustment so that an overlapping amount of the on period of the first PWM signal and the on period of the second PWM signal is smaller than an overlapping amount in a case where the operation is performed in the first control mode.

* * * * *